(12) United States Patent
Li et al.

(10) Patent No.: US 10,305,569 B2
(45) Date of Patent: May 28, 2019

(54) CHANNEL STATE INFORMATION FEEDBACK AND ACQUISITION METHOD AND DEVICE

(71) Applicant: China Academy of Telecommunications Technology, Beijing, China (CN)

(72) Inventors: Hui Li, Beijing (CN); Qiubin Gao, Beijing (CN); Runhua Chen, Beijing (CN); Tamrakar Rakesh, Beijing (CN); Wenhong Chen, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/563,464

(22) PCT Filed: Feb. 3, 2016

(86) PCT No.: PCT/CN2016/073363
§ 371 (c)(1),
(2) Date: Sep. 29, 2017

(87) PCT Pub. No.: WO2016/155416
PCT Pub. Date: Oct. 6, 2016

(65) Prior Publication Data
US 2018/0069613 A1 Mar. 8, 2018

(30) Foreign Application Priority Data
Mar. 31, 2015 (CN) .......................... 2015 1 0149954

(51) Int. Cl.
*H04B 7/06* (2006.01)
*H04W 24/10* (2009.01)
(Continued)

(52) U.S. Cl.
CPC ......... *H04B 7/0639* (2013.01); *H04B 7/0456* (2013.01); *H04B 7/0478* (2013.01);
(Continued)

(58) Field of Classification Search
CPC .. H04B 7/0639; H04B 7/0456; H04B 7/0478; H04B 7/06; H04B 7/0617; H04B 7/0632;
(Continued)

(56) References Cited

U.S. PATENT DOCUMENTS 9,344,164 B2 * 5/2016 Jing ...................... H04B 7/0469
9,491,654 B2 * 11/2016 Ko ........................ H04B 7/0626
(Continued)

FOREIGN PATENT DOCUMENTS

CN 103580739 A 2/2014
CN 103687010 A 3/2014
(Continued)

OTHER PUBLICATIONS

3GPP TSG-RAN WG1 #66, R1-112420, "Considerations on CSI feedback enhancements for high-priority antenna configurations" Athens, Greece, Aug. 22-26, 2011, (pp. 8).
(Continued)

*Primary Examiner* — Sophia Vlahos
(74) *Attorney, Agent, or Firm* — Foley & Lardner LLP

(57) ABSTRACT

Disclosed are a channel state information feedback and acquisition method and device. The application comprises: acquiring, by a terminal, a first-dimension downlink reference signal resource, S second-dimension downlink reference signal resources and a first corresponding relationship of the above configured by a network device; measuring, by the terminal and according to the first-dimension downlink reference signal resource, a first-dimension downlink reference signal, and selecting, by the terminal and according to the measured first-dimension PMI and the first correspond-
(Continued)

ing relationship, a resource for measuring a second-dimension downlink reference signal, measuring, according to the resource, the second-dimension downlink reference signal, and feeding back channel state information, wherein the second-dimension reference signal is transmitted after forming a first-dimension beamforming weight. The present application enables acquisition of channel state information between a network device and a terminal, and adjustment of the first-dimension beamforming weight for forming the second-dimension reference signal according to the PMI fed back by the first-dimension.

20 Claims, 7 Drawing Sheets

(51) Int. Cl.
    *H04L 1/00*      (2006.01)
    *H04B 7/0456*    (2017.01)
(52) U.S. Cl.
    CPC ............. *H04B 7/06* (2013.01); *H04B 7/066* (2013.01); *H04B 7/0617* (2013.01); *H04B 7/0632* (2013.01); *H04L 1/0026* (2013.01); *H04W 24/10* (2013.01); *H04B 7/0634* (2013.01)
(58) Field of Classification Search
    CPC ..... H04B 7/066; H04B 7/0634; H04L 1/0026; H04W 24/10
    See application file for complete search history.

(56) References Cited

U.S. PATENT DOCUMENTS

| | | | | |
|---|---|---|---|---|
| 9,985,709 | B2* | 5/2018 | Park | H04B 7/0473 |
| 2014/0079100 | A1* | 3/2014 | Kim | H04B 7/0417 |
| | | | | 375/219 |
| 2014/0185556 | A1 | 7/2014 | Chen et al. | |
| 2016/0308647 | A1* | 10/2016 | Kwak | H04B 7/0486 |

FOREIGN PATENT DOCUMENTS

| | | |
|---|---|---|
| CN | 103716078 A | 4/2014 |
| CN | 103840907 A | 6/2014 |
| WO | WO-2011/017576 A2 | 2/2011 |
| WO | WO-2014/003383 A1 | 1/2014 |
| WO | WO-2014/109622 A1 | 7/2014 |
| WO | WO-2014/168319 A1 | 10/2014 |
| WO | WO-2015/021596 A1 | 2/2015 |

OTHER PUBLICATIONS

3rd Generation Partnership Project; Technical Specification Group Radio Access Network. 1-26 "3GPP TS 36.213 V 11.9 .O", Evolved Universal Terrestrial Radio Access (E-UTRA); Physical Layer Procedures, Dec. 31, 2014 (Dec. 31, 2014), pp. 123-124.

Lg Electronics, "Enhancements on codebook and feedback mechanism," 3GPP TSG RAN WG1 Meeting #78bis, Oct. 6th-10th, 2014, Ljubljana, Slovenia, pp. 1-6.

* cited by examiner

CHANNEL STATE INFORMATION FEEDBACK AND ACQUISITION METHOD AND DEVICE

This application is a National Stage of International Application No. PCT/CN2016/073363, filed Feb. 3, 2016, which claims priority to Chinese Patent Application No. 201510149954.3, filed Mar. 31, 2015, both of which are hereby incorporated by reference in their entireties.

FIELD

The present application relates to the field of wireless communications, and particularly to a method and apparatus for feeding back and obtaining channel state information.

BACKGROUND

In a cellular system, an array of antennas in a base station is typically arranged horizontally. A beam of a transmitter in the base station can only be adjusted horizontally, and there is a fixed downward inclination angle for any user vertically, so various beam-forming/pre-coding, and other technologies are implemented based upon horizontal channel information. In fact, a radio signal is propagated in three dimensions in the space, so the performance of the system can not be optimized with the fixed downward inclination angle. Vertical adjustment to the beam is highly significant to an improvement in the performance of the system.

An array of active antennas in which each array element is separately controllable has emerged in the industry as the antenna technologies are advancing. With this design, the array of antennas can be evolved from the current horizontal arrangement into a two-dimension structure in which the antennas are arranged horizontally and vertically. As illustrated in FIG. 1a to FIG. 1d, there are schematic structural diagrams of antennas in two dimensions in the three-dimension (3D) Multiple-Input Multiple-Output (MIMO) technology, where the structures of the array of antennas including 8, 16, 32, and 64 antennas are illustrated respectively. An important characteristic of 3D MIMO is a very large number of antennas at the base station side, e.g., 64 antennas or more. This pattern of the array of antennas makes it possible to dynamically adjust the beam vertically.

Given a large number of antennas in the base station, how to obtain accurately the 3D channel state information between the base station and a terminal, and to further adjust dynamically the beam in the horizontal or vertical dimension has become a focus in the 3D MIMO technology.

SUMMARY

Embodiments of the application provide a method and apparatus for feeding back and obtaining channel state information so as to obtain channel state information between a network device and a terminal.

A method for feeding back channel state information according to an embodiment of the application includes:

obtaining, by a terminal, one first-dimension downlink reference signal resource, S second-dimension downlink reference signal resources, and a first correspondence relationship, configured by a network device, wherein the first correspondence relationship includes a correspondence relationship between the S second-dimension downlink reference signal resources and N first-dimension beam-forming weights, and both S and N are integers greater than 1;

measuring, by the terminal, a first-dimension downlink reference signal according to the first-dimension downlink reference signal resource to obtain a first-dimension Pre-coding matrix Indicator (PMI), wherein the first-dimension PMI indicates one of the N first-dimension beam-forming weights;

selecting, by the terminal, one of the S second-dimension downlink reference signal resources for measuring a second-dimension downlink reference signal, according to the obtained first-dimension PMI and the first correspondence relationship; and measuring, by the terminal, the second-dimension downlink reference signal, and feeding back channel state information, according to the selected resource for measuring the second-dimension downlink reference signal, wherein the second-dimension downlink reference signal transmitted over the selected second-dimension downlink reference signal resource is transmitted after being beam-formed using the first-dimension beam-forming weight corresponding to the resource.

A method for obtaining channel state information according to an embodiment of the application includes:

configuring, by a network device, a terminal with one first-dimension downlink reference signal resource, S second-dimension downlink reference signal resources, and a first correspondence relationship including a correspondence relationship between the S second-dimension downlink reference signal resources and N first-dimension beam-forming weights, wherein both S and N are integers greater than 1;

transmitting, by the network device, a first-dimension downlink reference signal according to the first-dimension downlink reference signal resource, and transmitting second-dimension downlink reference signals according to the second-dimension downlink reference signal resources, wherein the second-dimension downlink reference signal transmitted over each second-dimension downlink reference signal resource is transmitted after being beam-formed using the first-dimension beam-forming weight corresponding to the resource; and receiving, by the network device, channel state information measured and fed back by the terminal using the second-dimension downlink reference signal, and obtaining a channel state of the terminal from the channel state information, wherein the channel state information is obtained by the terminal by selecting one of the S second-dimension downlink reference signal resources for measuring the second-dimension downlink reference signal, according to a first-dimension Pre-coding matrix Indicator (PMI) obtained by measuring the first-dimension downlink reference signal, and the first correspondence relationship, and then measuring the second-dimension downlink reference signal according to the selected second-dimension downlink reference signal resource, and the first-dimension PMI indicates one of the N first-dimension beam-forming weights.

A terminal according to an embodiment of the application includes:

an obtaining module configured to obtain one first-dimension downlink reference signal resource, S second-dimension downlink reference signal resources, and a first correspondence relationship, configured by a network device, wherein the first correspondence relationship includes a correspondence relationship between the S second-dimension downlink reference signal resources and N first-dimension beam-forming weights, and both S and N are integers greater than 1;

a first measuring module configured to measure a first-dimension downlink reference signal according to the first-dimension downlink reference signal resource to obtain a first-dimension Pre-coding matrix Indicator (PMI), wherein the first-dimension PMI indicates one of the N first-dimension beam-forming weights;

a selecting module configured to select one of the S second-dimension downlink reference signal resources for measuring a second-dimension downlink reference signal, according to the obtained first-dimension PMI and the first correspondence relationship; and a second measuring module configured to measure the second-dimension downlink reference signal, and feed back channel state information, according to the selected resource for measuring the second-dimension downlink reference signal, wherein the second-dimension downlink reference signal transmitted over the selected second-dimension downlink reference signal resource is transmitted after being beam-formed using the first-dimension beam-forming weight corresponding to the resource.

A network device according to an embodiment of the application includes:

a configuring module configured to configure a terminal with one first-dimension downlink reference signal resource, S second-dimension downlink reference signal resources, and a first correspondence relationship including a correspondence relationship between the S second-dimension downlink reference signal resources and N first-dimension beam-forming weights, wherein both S and N are integers greater than 1;

a reference signal transmitting module configured to transmit a first-dimension downlink reference signal according to the first-dimension downlink reference signal resource, and to transmit second-dimension downlink reference signals according to the second-dimension downlink reference signal resources, wherein the second-dimension downlink reference signal transmitted over each second-dimension downlink reference signal resource is transmitted after being beam-formed using the first-dimension beam-forming weight corresponding to the resource; and a channel state determining module configured to receive channel state information measured and fed back by the terminal using the second-dimension downlink reference signal, and to obtain a channel state of the terminal from the channel state information, wherein the channel state information is obtained by the terminal by selecting one of the S second-dimension downlink reference signal resources for measuring the second-dimension downlink reference signal, according to a first-dimension Pre-coding matrix Indicator (PMI) obtained by measuring the first-dimension downlink reference signal, and the first correspondence relationship, and then measuring the second-dimension downlink reference signal according to the selected second-dimension downlink reference signal resource, and the first-dimension PMI indicates one of the N first-dimension beam-forming weights.

In the embodiments above of the application, the network device configures the terminal with one first-dimension downlink reference signal resource, S second-dimension downlink reference signal resources, and a first correspondence relationship including a correspondence relationship between the S second-dimension downlink reference signal resources and N first-dimension beam-forming weights; and the terminal measuring and feeding back a channel firstly measures a first-dimension PMI according to the first-dimension downlink reference signal resource, then determines one of the second-dimension downlink reference signal resources for a second-dimension channel measurement, according to the measured first-dimension PMI and the first correspondence relationship, and further measures second-dimension channel state information according to the determined second-dimension downlink reference signal resource. As can be apparent, on one hand, the second-dimension downlink reference signal resource for a measurement is determined based upon the first-dimension PMI, and beam-forming is performed thereon using the first-dimension beam-forming weight, so the measured second-dimension channel state can reflect a first-dimension characteristic of the terminal, and furthermore the three-dimension channel state of the terminal can be obtained; and on the other hand, the terminal measures the second-dimension channel state information according to only a part of the S second-dimension downlink reference signal resources, so the three-dimension channel state information of the terminal can be obtained without occupying a considerable overhead of the resources in the system.

DETAILED DESCRIPTION OF THE EMBODIMENTS

Embodiments of the application provide a solution to feeding back and obtaining channel state information so as to obtain three-dimension channel state information of a terminal.

The embodiments of the application can be applied to an FDD Multi-Input Multi-Output (MIMO) system or a Time Division Duplex (TDD) MIMO system to thereby address a feedback of channel state information.

In order to make the objects, technical solutions, and advantages of the application more apparent, the application will be described below in further details with reference to the drawings, and apparently the embodiments described here are only a part but not all of the embodiments of the application. Based upon the embodiments here of the application, all the other embodiments which can occur to those ordinarily skilled in the art without any inventive effort shall fall into the scope of the application as claimed.

A part of the embodiments of the application to be described below are intended to provide general understanding of the application, but not to ascertain essential or key elements of the application, or to define the scope to be claimed. Other embodiments of the application can be derived as a result of replacing some element in an embodiment of the application with that in another embodiment of the application without departing from the spirit of the application.

Figure 1A:
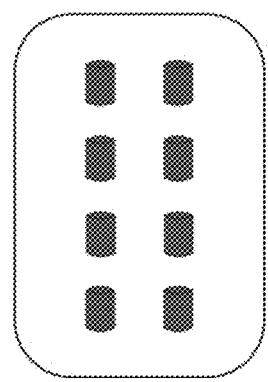
FIG. 1$a$ to FIG. 1$d$ are schematic structural diagrams of antennas in two dimensions in 3D MIMO in the prior art.
Figure 1B:
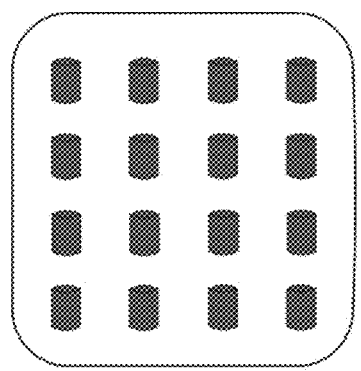
Figure 1C:
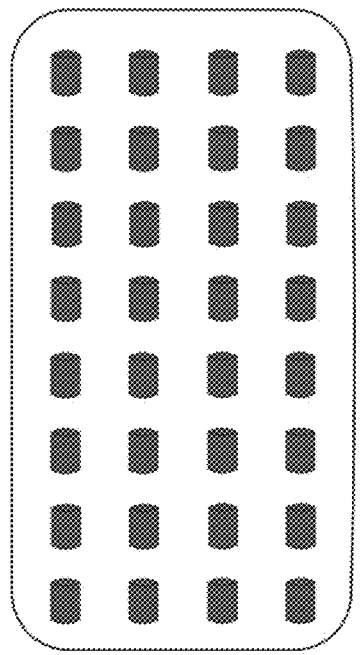
Figure 1D:
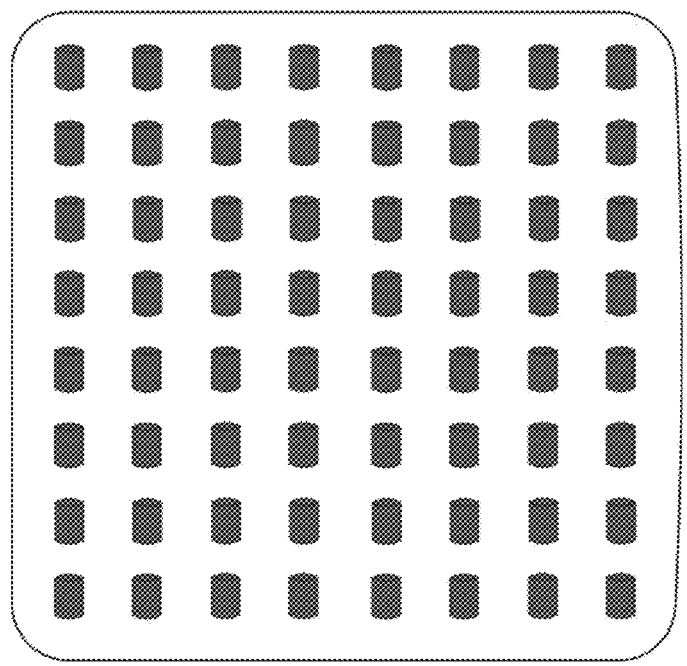
Figure 2:
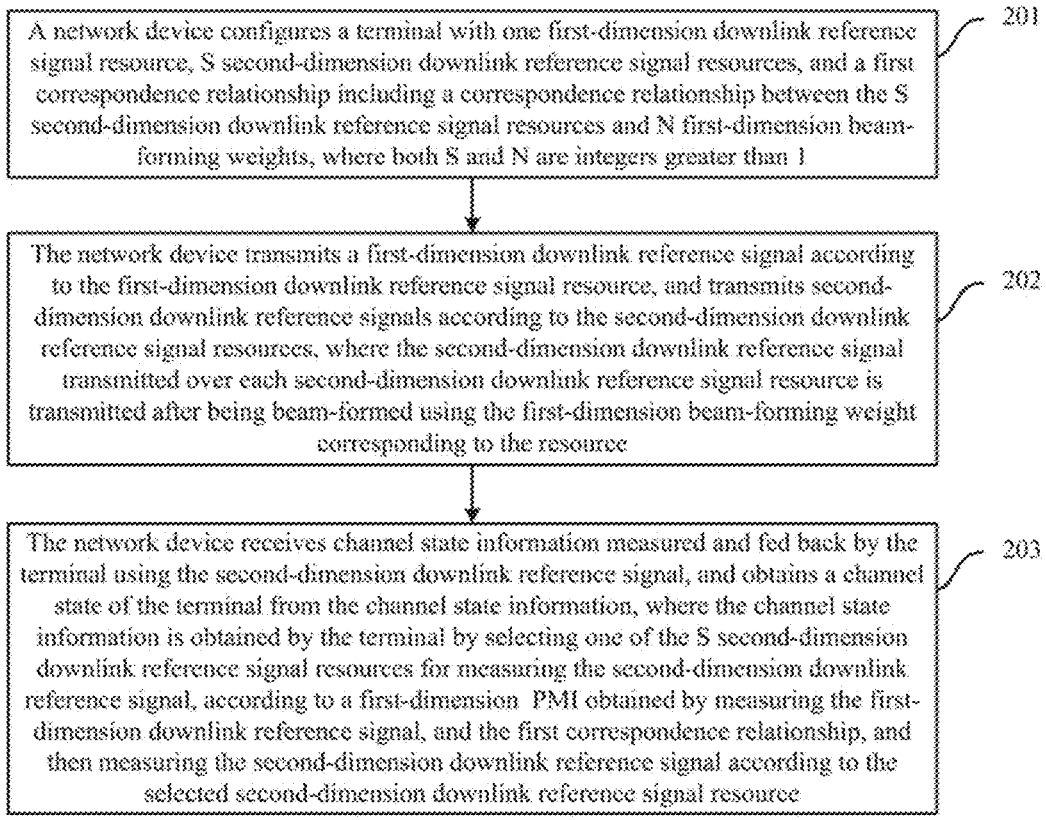
FIG. 2 is a schematic flow chart of obtaining channel state information at the network side according to an embodiment of the application.

Referring to FIG. 2, there is a schematic flow chart of feeding back channel state information according to an embodiment of the application. The flow is performed at the network side, for example, it can be performed by a base station. As illustrated, the flow can include the following operations.

In the operation 201, a network device configures a terminal with one first-dimension downlink reference signal resource, S second-dimension downlink reference signal resources, and a first correspondence relationship including a correspondence relationship between the S second-dimension downlink reference signal resources and N first-dimension beam-forming weights, where both S and N are integers greater than 1.

In the operation 202, the network device transmits a first-dimension downlink reference signal according to the first-dimension downlink reference signal resource, and transmits second-dimension downlink reference signals according to the second-dimension downlink reference signal resources, where the second-dimension downlink reference signal transmitted over each second-dimension downlink reference signal resource is transmitted after being beam-formed using the first-dimension beam-forming weight corresponding to the resource.

In the operation 203, the network device receives channel state information measured and fed back by the terminal using the second-dimension downlink reference signal, and obtains a channel state of the terminal from the channel state information, where the channel state information is obtained by the terminal by selecting one of the S second-dimension downlink reference signal resources for measuring the second-dimension downlink reference signal, according to a first-dimension PMI obtained by measuring the first-dimension downlink reference signal, and the first correspondence relationship, and then measuring the second-dimension downlink reference signal according to the selected second-dimension downlink reference signal resource, and the first-dimension PMI indicates one of the N first-dimension beam-forming weights.

In the operation 201, the network device can define a set including the N first-dimension beam-forming weights. The first-dimension beam-forming weights in the set are used for first-dimension beam-forming on the downlink reference signals transmitted over the S second-dimension downlink reference signal resources. The correspondence relationship between the first-dimension beam-forming weights in the set and the second-dimension downlink reference signal resources is referred to as the first correspondence relationship. For the sake of a convenient description below, the set including all the first-dimension beam-forming weights corresponding to the second-dimension downlink reference signal resources, or the set including all the first-dimension beam-forming weights for beam-forming on the downlink reference signals transmitted over the second-dimension downlink reference signal resources will be referred to as a set A. The set A is known to both the network device and the terminal, and the set is configured in the terminal as a codebook for the terminal to feed back channel state information (i.e., a set of pre-coding matrixes). The codebook includes all the first-dimension beam-forming weights in the set A, and their corresponding PMIs.

In the operation 201, the network device can signal configuration information of the first-dimension downlink reference signal resource, configuration information of the S second-dimension downlink reference signal resources, and the first correspondence relationship (i.e., the correspondence relationship between the N first-dimension beam-forming weights and the S second-dimension downlink reference signal resources) to the terminal, where the first correspondence relationship can be configured in the form of a list, or can be configured in another form.

For example, the first correspondence relationship can be presented in the form of a list depicted in Table 1 below:

TABLE 1

| The first correspondence relationship in the form of a list | |
|---|---|
| Index of second-dimension downlink reference signal resource | PMI corresponding to first-dimension beam-forming weight |
| Index1 | PMI 1 |
| Index2 | PMI 2 |
| ... | ... |

In the operation 202, the network device transmits the second-dimension downlink reference signals according to the second-dimension downlink reference signal resources, where the relationship between the first-dimension beam-forming weight for the second-dimension downlink reference signal transmitted over each second-dimension downlink reference signal resource, and the second-dimension downlink reference signal resource agrees with the first correspondence relationship. For example, the base station determines the first-dimension beam-forming weight for each downlink reference signal resource according to the first correspondence relationship, and performs beam-forming on the downlink reference signal transmitted over the corresponding second-dimension downlink reference signal resource using the determined first-dimension beam-forming weight.

The S second-dimension downlink reference signal resources may be configured with different sub-frame offsets so that different time-frequency resources are occupied by the different second-dimension downlink reference signal resources. The S second-dimension downlink reference signal resources may alternatively be configured with the same sub-frame and offset, but arranged at different positions in a sub-frame so that different frequency resources are occupied by the different second-dimension downlink reference signal resources.

As can be apparent, there is a first-dimension beam-forming matrix, corresponding to a first-dimension beam direction, applicable to each second-dimension downlink reference signal resource so that the S second-dimension downlink reference signal resources can cover a cell in the first dimension.

In the operation 203, the channel state information fed back by the terminal after measuring the second-dimension downlink reference signal can include index of the selected second-dimension downlink reference signal resource for measuring the second-dimension downlink reference signal, and a second-dimension PMI, a Rank indicator (RI), and a Channel Quality Indicator (CQI) obtained by measuring the second-dimension downlink reference signal according to the selected second-dimension downlink reference signal resource.

Accordingly the network device can determine the first-dimension beam-forming weight corresponding to the second-dimension downlink reference signal resource according to the index of the second-dimension downlink reference signal resource, and the first correspondence relationship, for example, it can obtain the PMI corresponding to the first-dimension beam-forming weight by referring to Table 1 using the index of the second-dimension downlink reference signal resource. Then the network device further combines the pre-coding matrix indicated by the second-dimension PMI with the determined first-dimension beam-forming weight into a three-dimension pre-coding matrix of the terminal, for example, it can calculate the pre-coding matrix of the terminal in Equation (1) or Equation (2) of:

$$V = V_1 \otimes V_2 \quad (1)$$

$$V = V_2 \otimes V_1 \quad (2)$$

Where V represents the pre-coding matrix of the terminal, where the pre-coding matrix reflect a three-dimension channel state of the terminal; $V_1$ represents the first-dimension beam-forming weight; $V_2$ represents the pre-coding matrix indicated by the second-dimension PMI; and $\otimes$ represents a Kronecker product operation.

Since the set A includes the N first-dimension beam-forming weights, and the number of second-dimension downlink reference signal resources is S, there are three instances of N=S, N>S, and N<S. The embodiments of the application will be described below in details respectively in the three instances.

(1) N=S.

In the instance of N=S, the set A includes all the N first-dimension beam-forming weights, so each first-dimension beam-forming weight corresponds to one of the second-dimension downlink reference signal resources in the first correspondence relationship.

In the operation 202, the network device can determine the first-dimension beam-forming weight corresponding to each second-dimension downlink reference signal resource according to the first correspondence relationship, and performs beam-forming on and then transmits the downlink reference signal transmitted over the corresponding second-dimension downlink reference signal resource using the first-dimension beam-forming weight uniquely corresponding to the resource.

(2) N>S.

In the instance of N>S, in a possible implementation, the set A includes all the N first-dimension beam-forming weights, and in the first correspondence relationship, at least one of the second-dimension downlink reference signal resources corresponds to a plurality of first-dimension beam-forming weights; and one of the plurality of first-dimension beam-forming weights is used for beam-forming on the downlink reference signal transmitted over the second-dimension downlink reference signal resource, the other first-dimension beam-forming weights are not used for beam-forming on any downlink reference signal, and the other first-dimension beam-forming weights are highly correlated with the first-dimension beam-forming weight for beam-forming on the downlink reference signal transmitted over the second-dimension downlink reference signal resource, for example, a correlation metric is greater than a threshold.

For example, the first correspondence relationship can be presented in the form of a list depicted in Table 2.

TABLE 2

The first correspondence relationship in the form of a list

| Index of second-dimension downlink reference signal resource | PMI corresponding to first-dimension beam-forming weight |
|---|---|
| Index1 | PMI 1, PMI 2 |
| Index2 | PMI 3 |
| ... | ... |

In Table 2, the first-dimension beam-forming weight corresponding to the PMI 1 is used for beam-forming on the downlink reference signal transmitted over the second-dimension downlink reference signal resource corresponding to the index 1, and the first-dimension beam-forming weight corresponding to the PMI 2 is not used for beam-forming on any downlink reference signal transmitted over any second-dimension downlink reference signal resource. The first-dimension beam-forming weights corresponding to the PMI 1 and the PMI 2 are highly correlated, for example, the difference in angle between first-dimension beams corresponding to the PMI 1 and the PMI 2 is less than a preset threshold.

In this instance, in the operation 202, the network device can determine the first-dimension beam-forming weight corresponding to each second-dimension downlink reference signal resource according to the first correspondence relationship, and perform beam-forming on and then transmit the downlink reference signal transmitted over the corresponding second-dimension downlink reference signal resource using the first-dimension beam-forming weight for beam-forming corresponding to the resource.

In the instance of N>S, in another possible implementation, the set A includes S first-dimension beam-forming weights, or of course, the set A may include all the N first-dimension beam-forming weights, and in the first correspondence relationship, each of the S first-dimension beam-forming weights among the N first-dimension beam-forming weights corresponds respectively to one of the second-dimension downlink reference signal resources.

In the operation 201, the network device can select the S first-dimension beam-forming weights from the N first-dimension beam-forming weights to be used for beam-forming on the downlink reference signals transmitted over these S second-dimension downlink reference signal resources, and signal configuration information of the first-dimension downlink reference signal resource, configuration information of the S second-dimension downlink reference signal resources, and the first correspondence relationship (i.e., the correspondence relationship between the N first-dimension beam-forming weights and the S second-dimension downlink reference signal resources) to the terminal. Furthermore the network device can further signal the selected S first-dimension beam-forming weights to the terminal.

In the operation 202, the network device can determine the first-dimension beam-forming weight corresponding to each second-dimension downlink reference signal resource according to the first correspondence relationship, and perform beam-forming on and then transmit the downlink reference signal transmitted over the corresponding second-dimension downlink reference signal resource using the first-dimension beam-forming weight uniquely corresponding to the resource.

(3) N<S.

In the instance of N<S, the set A includes all the N first-dimension beam-forming weights. Furthermore the network device further configures a second set, which will be referred to as a set B for the sake of a convenient description. The set B includes at least S first-dimension beam-forming weights, and preferably the set B includes S first-dimension beam-forming weights. The set B including S first-dimension beam-forming weights will be described below as an example.

There is some correspondence relationship between the first-dimension beam-forming weights in the set B, and the first-dimension beam-forming weights in the set A, where the correspondence relationship between the first-dimension beam-forming weights in the set B and the set A will be referred to as a second correspondence relationship so as to be distinguished from the first correspondence relationship. Preferably the set A is a subset of the set B. At least one of the first-dimension beam-forming weights in the set A corresponds to more than one of the first-dimension beam-forming weights in the set B according to the second correspondence relationship. If one of the first-dimension beam-forming weights in the set A corresponds to more than one of the first-dimension beam-forming weights in the set B, then the more than one first-dimension beam-forming weights in the set B will be highly correlated, for example, a correlation meter between the more than one first-dimension beam-forming weights will be greater than a preset threshold.

The set A is configured at the terminal side as a codebook for feeding back channel state information.

In this instance, the first correspondence relationship refers to a correspondence relationship between the first-dimension beam-forming weights in the set B, and the second-dimension downlink reference signal resources, and particularly each first-dimension beam-forming weight corresponds to one of the second-dimension downlink reference signal resources in the first correspondence relationship so that the S first-dimension beam-forming weights correspond to S second-dimension downlink reference signal resources in a one-to-one manner.

In the operation 201, the network device can signal configuration information of the first-dimension downlink reference signal resource, configuration information of the S second-dimension downlink reference signal resources, the set A, the set B, the first correspondence relationship (i.e., the correspondence relationship between the N first-dimension beam-forming weights and the S second-dimension downlink reference signal resources), and the second correspondence relationship (i.e., the correspondence relationship between the first-dimension beam-forming weights in the set A and the set B) to the terminal.

In the operation 202, the network device can determine the first-dimension beam-forming weight corresponding to each second-dimension downlink reference signal resource according to the first correspondence relationship, and perform beam-forming on and then transmit the downlink reference signal transmitted over the corresponding second-dimension downlink reference signal resource using the first-dimension beam-forming weight uniquely corresponding to the resource.

As can be apparent from the description above of the flow illustrated in FIG. 2, the network device configures the terminal with one first-dimension downlink reference signal resource, S second-dimension downlink reference signal resources, and a first correspondence relationship including a correspondence relationship between the S second-dimension downlink reference signal resources and N first-dimension beam-forming weights, so that the terminal measuring and feeding back a channel firstly measures a first-dimension PMI according to the first-dimension downlink reference signal resource, then determines one of the second-dimension downlink reference signal resources for a second-dimension channel measurement, according to the measured first-dimension PMI and the first correspondence relationship, and further measures second-dimension channel state information according to the determined second-dimension downlink reference signal resource. As can be apparent, on one hand, the second-dimension downlink reference signal resource for a measurement is determined based upon the first-dimension PMI, and beam-forming is performed thereon using the first-dimension beam-forming weight, so the measured second-dimension channel state can reflect a first-dimension characteristic of the terminal, and furthermore the three-dimension channel state of the terminal can be obtained; and on the other hand, the terminal measures the second-dimension channel state information according to only a part of the S second-dimension downlink reference signal resources, so the three-dimension channel state information of the terminal can be obtained without occupying a considerable overhead of the resources in the system.

Preferably the network device can further receive first-dimension PMIs fed back by terminals in a coverage area of the network device, where the first-dimension PMIs are measured and fed back by the terminals on the downlink reference signals transmitted over the first-dimension downlink reference signal resources configured by the network device. The first-dimension PMIs reflect first-dimension characteristics of the terminals. The network device can perform one or more of the following operations according to the first-dimension PMIs fed back by the terminals in the coverage area of the network device.

In a first operation, in the instance of N>S, the network device selects the S first-dimension beam-forming weights from the N first-dimension beam-forming weights according to the first-dimension PMIs fed back by the terminals in the coverage area of the network device, to perform beam-forming on the downlink reference signals transmitted over the S second-dimension downlink reference signal resources, for example, it selects first-dimension beam-forming weights corresponding to S PMIs with the highest feedback frequencies.

Since the first-dimension PMIs can reflect the characteristics of the terminals in the first dimension, the S first-dimension beam-forming weights can be selected according to the first-dimension PMIs fed back by the terminals by selecting the first-dimension beam-forming weights for the terminals currently distributed in the first dimension, and also since the first-dimension beam-forming weights are used for beam-forming on the second-dimension downlink reference signals, the terminals measuring the second-dimension downlink reference signals and feeding back the channel state information can obtain accurate channel state information.

In a second operation, in the instance of N>S, after the network device selects the S first-dimension beam-forming weights from the N first-dimension beam-forming weights, it can further determine a distribution condition of the terminals in the coverage area of the network device according to the first-dimension PMIs fed back by the terminals in the coverage area of the network device, reselect the S first-dimension beam-forming weights from the N first-dimension beam-forming weights for the terminals according to the distribution condition of the terminals, and notify a correspondence relationship between the reselected S first-dimension beam-forming weights, and the S second-dimension downlink reference signal resources to the terminals. For example, if a significant change in distribution of the terminals is determined according to the first-dimension PMIs fed back by the terminals, then the network device may reselect the S first-dimension beam-forming weights for the terminals, and notify a correspondence relationship between the selected S first-dimension beam-forming weights, and the second-dimension downlink reference signal resources to the terminals; otherwise, it may maintain the existing first correspondence relationship.

With the second operation above, the distribution condition of the terminals can be obtained in a timely manner to thereby adjust the selection of a matrix of the S first-dimension beam-forming weights according to the change in distribution of the terminals in a timely manner so as to obtain more accurate channel state information.

In a third operation, a distribution of the terminals in the coverage area of the network device in the first dimension is determined, the first-dimension beam-forming weights are adjusted, that is, the directions of the first-dimension beam-forming weights are changed, according to the distribution of the terminals in the coverage area of the network device in the first dimension, and furthermore the codebook at the terminal side is updated according to the adjusted first-dimension beam-forming weights, where the correspondence relationship between the first-dimension beam-forming weights and the second-dimension downlink reference signal resources may be maintained.

With the third operation above, the first-dimension beam-forming weights can be adjusted according to the distribution condition of the terminals in the first dimension to thereby better reflect the characteristics of the terminals in the first dimension so as to improve the accuracy in measuring and feeding back the channel state information.

The embodiments of the application can be applicable to a network device with an array of antennas at a large scale.

Preferably the array of antennas of the network device can be divided into K (K is an integer greater than 1) groups of antennas as per dimension, where antenna ports of the first-dimension downlink reference signal resource correspond to antenna elements in one or more groups of antennas, and the number of antenna ports is less than or equal to the number of antenna elements in a group of antennas; and antenna ports of each second-dimension downlink reference signal resource correspond to one or more groups of antennas, and the number of antenna ports is less than or equal to the number K of groups of antennas.

Taking a base station as an example, an array of antennas of the base station can be divided into K groups, each of which includes P (P is an integer greater than or equal to 1) antenna elements. In a grouping pattern, the antennas are grouped according to rows and columns of the array of antennas. Particularly if the first dimension is the vertical dimension, and the second dimension is the horizontal dimension, then each column of antennas will be grouped into a group, and for an array of cross-polarized antennas, antennas in each column polarized in the same direction can be grouped into a group, that is, a column of antennas can be divided into two groups of antennas polarized in different directions; and if the first dimension is the horizontal dimension, and the second dimension is the vertical dimension, then each row of antennas will be grouped into a group, and for an array of cross-polarized antennas, antennas in each row polarized in the same direction can also be grouped into a group. In another grouping pattern, the antennas are grouped into blocks so that the array of antennas is divided into K blocks, each of which includes P antenna elements. At this time, the first dimension refers to antennas in a block, and the second dimension refers to being across the blocks.

As per the grouping of antennas above, the first-dimension downlink reference signal resource uses a number of antenna ports arranged in the first dimension, and the number of antenna ports is less than or equal to the number P of antenna elements in a group of antennas, where in an implementation, a downlink reference signal is transmitted from some group in the array of antennas, that is, a downlink reference signal of each antenna port of the first-dimension downlink reference signal resource is transmitted from respective antenna elements in a group of antennas, or downlink reference signals transmitted from the antenna elements in the K groups of antennas can be weighted so that a downlink reference signal of each antenna port of the first-dimension downlink reference signal resource is weighted across the groups of antennas, and then transmitted from the K antenna elements in the K groups of antennas corresponding to the antenna port.

For the S second-dimension downlink reference signal resources, each resource uses a number of antenna ports arranged in the second dimension, and the number of antenna ports is less than or equal to the number K of groups of antennas; and a pilot signal of each antenna port is weighted using one of the first-dimension beam-forming weights, and then transmitted from antenna elements in a group of antennas corresponding to the port.

In the embodiments of the application, the antenna elements have been described, where the antenna elements include active antennas with the respective array elements which are separately controllable, and antenna power amplifiers are integrated together with the antenna ports. This solution can also be applicable to antenna elements arranged in another form. Suppose each antenna element includes a corresponding transceiver radio unit (TXRU), that is, the TXRU is mapped to the antenna element in a one-to-one manner. If one TXRU is mapped to a number of antenna elements, then an antenna element described in the embodiments of the application will refer to a group of antenna elements to which one TXRU is mapped.

Figure 3:
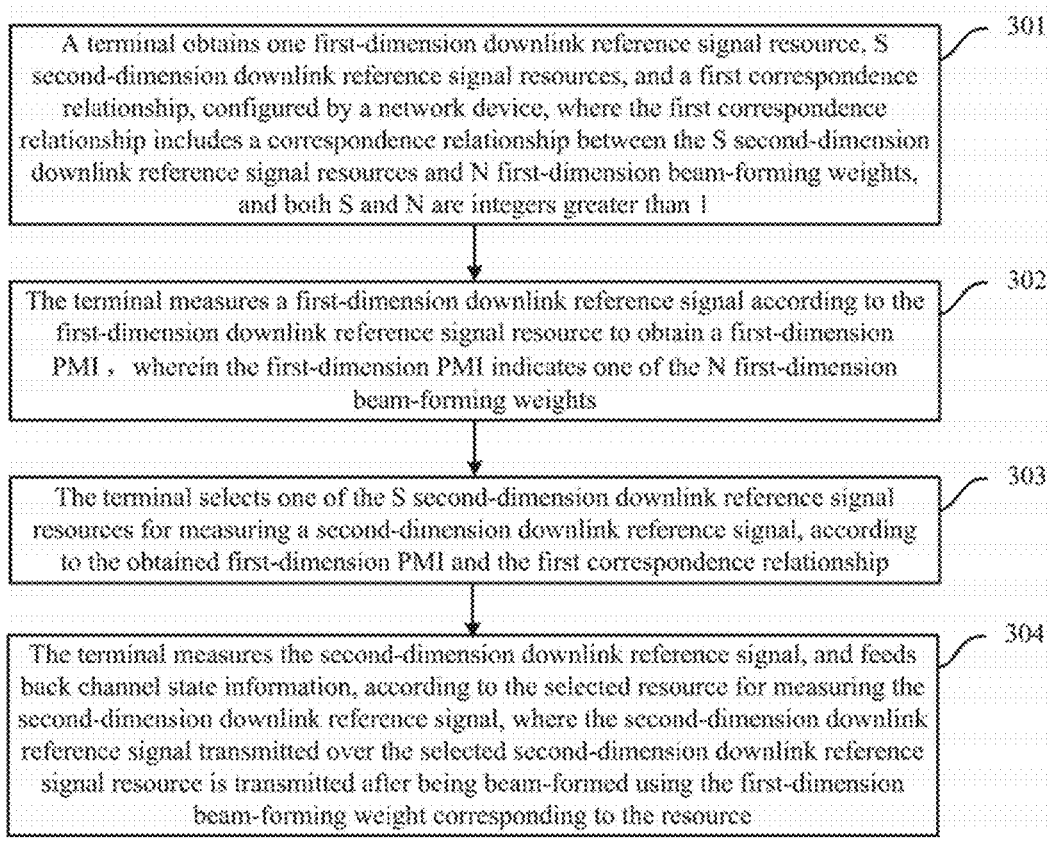
FIG. 3 is a schematic flow chart of feeding back channel state information at the terminal side according to an embodiment of the application.

Referring to FIG. 3, there is illustrated a schematic flow chart of feeding back channel state information according to an embodiment of the application. The flow is performed at the terminal side. As illustrated, the flow can include the following operations.

In the operation 301, a terminal obtains one first-dimension downlink reference signal resource, S second-dimension downlink reference signal resources, and a first correspondence relationship, configured by a network device, where the first correspondence relationship includes a correspondence relationship between the S second-dimension downlink reference signal resources and N first-dimension beam-forming weights, and both S and N are integers greater than 1.

In the operation 302, the terminal measures a first-dimension downlink reference signal according to the first-dimension downlink reference signal resource to obtain a first-dimension PMI, wherein the first-dimension PMI indicates one of the N first-dimension beam-forming weights.

In the operation 303, the terminal selects one of the S second-dimension downlink reference signal resources for measuring a second-dimension downlink reference signal, according to the obtained first-dimension PMI and the first correspondence relationship.

In the operation 304, the terminal measures the second-dimension downlink reference signal, and feeds back channel state information, according to the selected resource for measuring the second-dimension downlink reference signal, where the second-dimension downlink reference signal transmitted over the selected second-dimension downlink reference signal resource is transmitted after being beam-formed using the first-dimension beam-forming weight corresponding to the resource.

In the flow above, the operation process or mode of the network device in the flow involving the network device can be as described in the flow at the network side. For example, the operations in the operation 301 in which the network device configures the terminal with the first-dimension downlink reference signal resource, the second-dimension downlink reference signal resources, and the first correspondence relationship can be as described in the embodiments above, so a repeated description thereof will be omitted here.

As described above, the set including all the first-dimension beam-forming weights corresponding to the second-dimension downlink reference signal resources, or the set including all the first-dimension beam-forming weights for beam-forming on the downlink reference signals transmitted over the second-dimension downlink reference signal resources can be referred to as a set A. The set A is known to both the network device and the terminal, and the set is configured in the terminal as a codebook for the terminal to feed back channel state information (i.e., a set of pre-coding matrixes). The codebook includes all the first-dimension beam-forming weights in the set A, and their corresponding PMIs.

In the operation 302, the terminal can receive and measure the downlink reference signal over the corresponding first-dimension downlink reference signal resource, and obtain the first-dimension PMI corresponding to the measurement result according to the measurement result and the set A.

Since the set A includes the N first-dimension beam-forming weights, and the number of second-dimension downlink reference signal resources is S, there are three instances of N=S, N>S, and N<S. The embodiments of the application will be described below in details respectively in the three instances.

(1) N=S.

In the instance of N=S, the set A includes all the N first-dimension beam-forming weights, so each first-dimension beam-forming weight corresponds to one of the second-dimension downlink reference signal resources in the first correspondence relationship.

In this instance, in the operation 303, the terminal refers to the first correspondence relationship using the first-dimension PMI obtained in the operation 302, obtains the second-dimension downlink reference signal resource uniquely corresponding to the first-dimension PMI, and determines the obtained second-dimension downlink reference signal resource as the resource for measuring the second-dimension downlink reference signal.

(2) N>S.

In the instance of N>S, in a possible implementation, the set A includes S first-dimension beam-forming weights, or of course, the set A may include all the N first-dimension beam-forming weights, and in the first correspondence relationship, each of the S first-dimension beam-forming weights among the N first-dimension beam-forming weights corresponds respectively to one of the second-dimension downlink reference signal resources.

In this instance, some first-dimension beam-forming weights are absent in the first correspondence relationship, that is, more than one first-dimension beam-forming weights may correspond to one of the second-dimension downlink reference signal resources. In an implementation, as per some metric criterion between the first-dimension beam-forming weights, a second-dimension downlink reference signal resource corresponding to such a beam-forming weight in the set A is selected for a measurement that the beam-forming weight and the measured first-dimension PMI satisfy the metric criterion. The metric criterion may be that the correlation between the beam-forming weights is greater than some threshold.

Particularly in the operation 303, the terminal refers to the first correspondence relationship using the first-dimension PMI obtained in the operation 302; and if a second-dimension downlink reference signal resource corresponding to the first-dimension PMI is found, then the terminal will determine the found second-dimension downlink reference signal resource as the resource for measuring the second-dimension downlink reference signal; or if no second-dimension downlink reference signal resource corresponding to the first-dimension PMI is found, then the terminal will select one of these S first-dimension beam-forming weights according to the correlations between these S first-dimension beam-forming weights, and the first-dimension beam-forming weight indicated by the first-dimension PMI, refer to the first correspondence relationship for the second-dimension downlink reference signal resource corresponding to the selected first-dimension beam-forming weight, and determine the found second-dimension downlink reference signal resource as the resource for measuring the second-dimension downlink reference signal.

In the instance of N>S, in another possible implementation, the set A includes all the N first-dimension beam-forming weights, and in the first correspondence relationship, at least one of the second-dimension downlink reference signal resources corresponds to a plurality of first-dimension beam-forming weights; and one of the plurality of first-dimension beam-forming weights is used for beam-forming on the downlink reference signal transmitted over the second-dimension downlink reference signal resource, the other first-dimension beam-forming weights are not used for beam-forming on any downlink reference signal, and the other first-dimension beam-forming weights are highly correlated with the first-dimension beam-forming weight for beam-forming on the downlink reference signal transmitted over the second-dimension downlink reference signal resource, for example, a correlation metric is greater than a threshold.

In this instance, in the operation 303, the terminal refers to the first correspondence relationship using the first-dimension PMI obtained in the operation 302, finds a second-dimension downlink reference signal resource corresponding to the first-dimension PMI, and determines the found second-dimension downlink reference signal resource as the resource for measuring the second-dimension downlink reference signal. This implementation can save an overhead of processing resources in the terminal as compared with the implementation above in the instance of N>S.

(3) N<S.

In the instance of N<S, the set A includes all the N first-dimension beam-forming weights. Furthermore the network device further configures a second set, which will be referred to as a set B for the sake of a convenient description. The set B includes at least S first-dimension beam-forming weights, and preferably the set B includes S first-dimension beam-forming weights. The set B including S first-dimension beam-forming weights will be described below as an example.

There is some correspondence relationship between the first-dimension beam-forming weights in the set B, and the first-dimension beam-forming weights in the set A, where the correspondence relationship between the first-dimension beam-forming weights in the set B and the set A will be referred to as a second correspondence relationship so as to be distinguished from the first correspondence relationship. Preferably the set A is a subset of the set B. At least one of the first-dimension beam-forming weights in the set A corresponds to more than one of the first-dimension beam-forming weights in the set B according to the second correspondence relationship. If one of the first-dimension beam-forming weights in the set A corresponds to more than one of the first-dimension beam-forming weights in the set B, then the more than one first-dimension beam-forming weights in the set B will be highly correlated, for example, a correlation metric between the more than one first-dimension beam-forming weights will be greater than a preset threshold.

The set A is configured at the terminal side as a codebook for feeding back channel state information.

In this instance, the network device further configures the terminal with the second correspondence relationship in the operation 301 or at another point of time. For example, the network device can configure the terminal with the second correspondence relationship in a broadcast message or higher-layer signaling.

In the operation 303, the terminal can refer to the second correspondence relationship using the first-dimension PMI obtained in the operation 302, and obtain the first-dimension beam-forming weight in the set B corresponding to the first-dimension PMI, where since the set A is configured in the terminal as the codebook for measuring and feeding back the channel state information, the terminal obtains the first-dimension PMI based upon the set A in the operation 302, that is, the first-dimension PMI indicates one of the first-dimension beam-forming weights in the set A, so that the terminal can refer to the second correspondence relationship using the first-dimension PMI to obtain the PMI in the set B corresponding to the PMI in the set A. Then the terminal refers to the first correspondence relationship using the obtained first-dimension beam-forming weight in the set B, obtains the corresponding second-dimension downlink reference signal resource, and determines the obtained second-dimension downlink reference signal resource as the resource for measuring the second-dimension downlink reference signal.

Furthermore in the operation 303, if the terminal obtains a number of second-dimension downlink reference signal resources as a result, then it may determine these second-dimension downlink reference signal resources as resources for measuring the second-dimension downlink reference signal, or may select a part of the resources as the resource for measuring the second-dimension downlink reference signal.

In the flow illustrated in FIG. 3, the terminal measures the second-dimension downlink reference signal, and feeds back the channel state information, according to the resource for measuring the second-dimension downlink reference signal, determined in the operation 303, in the operation 304.

The terminal measures and calculates horizontal channel state information over the found one or more horizontal CSI-RS resources, and selects one of the horizontal channel state information for a feedback, or feeds back all the horizontal channel state information.

Here the channel state information fed back by the terminal after measuring the second-dimension downlink reference signal typically can include the following items: a second-dimension PMI, a RI, and a CQI, obtained by measuring the second-dimension downlink reference signal according to the resource for measuring the second-dimension downlink reference signal, selected in the operation 303. Furthermore in an embodiment of the application, the channel state information fed back by the terminal can further include the index of the second-dimension downlink reference signal resource for measuring the second-dimension downlink reference signal, selected in the operation 303 so that the network device obtains a three-dimension channel state of the terminal according to the pre-coding matrix indicated by the PMI fed back by the terminal, and the first-dimension beam-forming weight corresponding to the index of the resource.

Since the downlink reference signal transmitted over the second-dimension downlink reference signal resource is beam-formed in the first dimension using the corresponding first-dimension beam-forming weight, the channel state information measured and fed back by the terminal based upon the second-dimension downlink reference signal includes a gain in the first dimension.

As can be apparent from the description above of the flow illustrated in FIG. 2, the network device configures the terminal with one first-dimension downlink reference signal resource, S second-dimension downlink reference signal resources, and a first correspondence relationship including a correspondence relationship between the S second-dimension downlink reference signal resources and N first-dimension beam-forming weights, so that the terminal measuring and feeding back a channel firstly measures a first-dimension PMI according to the first-dimension downlink reference signal resource, then determines one of the second-dimension downlink reference signal resources for a second-dimension channel measurement, according to the measured first-dimension PMI and the first correspondence relationship, and further measures second-dimension channel state information according to the determined second-dimension downlink reference signal resource. As can be apparent, on one hand, the second-dimension downlink reference signal resource for a measurement is determined based upon the first-dimension PMI, and beam-forming is performed thereon using the first-dimension beam-forming weight, so the measured second-dimension channel state can reflect a first-dimension characteristic of the terminal, and furthermore the three-dimension channel state of the terminal can be obtained; and on the other hand, the terminal measures the second-dimension channel state information according to only a part of the S second-dimension downlink reference signal resources, so the three-dimension channel state information of the terminal can be obtained without occupying a considerable overhead of the resources in the system.

Preferably the terminal can further feed the first-dimension PMI obtained in the operation 302 to the network device. The first-dimension PMI can reflect the first-dimension characteristic of the terminal. The network device can perform one or more of the following operations according to the first-dimension PMIs fed back by the terminals in the coverage area of the network device.

In a first operation, in the instance of N>S, the network device selects the S first-dimension beam-forming weights from the N first-dimension beam-forming weights to perform beam-forming on the downlink reference signals transmitted over the S second-dimension downlink reference signal resources.

In a second operation, in the instance of N>S, after the network device selects the S first-dimension beam-forming weights front the N first-dimension beam-forming weights, it can further determine a distribution condition of the terminals in the coverage area of the network device according to the first-dimension PMIs fed back by the terminals in the coverage area of the network device, reselect the S first-dimension beam-forming weights from the N first-dimension beam-forming weights for the terminals according to the distribution condition of the terminals, and notify a correspondence relationship between the reselected S first-dimension beam-forming weights, and the S second-dimension downlink reference signal resources to the terminals.

In a third operation, a distribution of the terminals in the coverage area of the network device in the first dimension is determined, the first-dimension beam-forming weights are adjusted according to the distribution of the terminals in the coverage area of the network device in the first dimension, and furthermore the codebook at the terminal side is updated according to the adjusted first-dimension beam-forming weights.

In the respective embodiments above of the application, the downlink reference signal can be a Cell-specific Reference Signal (CRS) or a CSI-RS, or another reference signal which can be used for measuring channel state information, although the embodiments of the application will not be limited to any particular type of downlink reference signal.

In the respective embodiments above of the application, the first dimension is the vertical dimension, and the second dimension is the horizontal dimension; or the first dimension is the horizontal dimension, and the second dimension is the vertical dimension.

Figure 4:
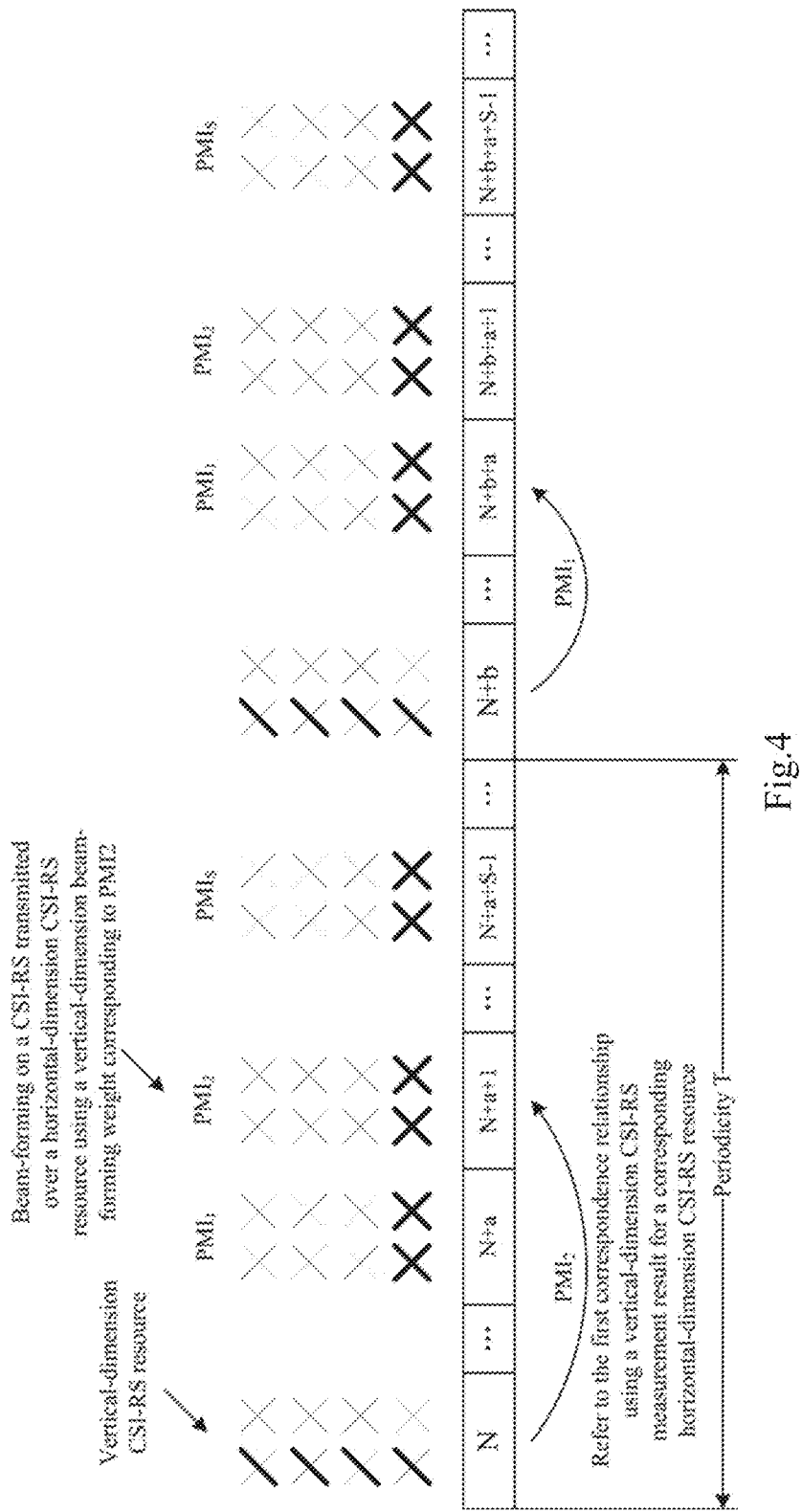
FIG. 4 is a schematic diagram of an operating principle according to an embodiment of the application.

Taking the first dimension being the vertical dimension, and the second dimension being the horizontal dimension as an example, FIG. 4 illustrates a schematic diagram of an operating principle of the application. In FIG. 4, there are four rows and two columns in an array of antennas in a base station, where antenna elements polarized in the same direction in the first column of antennas are grouped into a group of antennas in the vertical dimension, and antenna elements in each row of antennas are grouped into a group of antennas in the horizontal dimension.

In a periodicity T, time-frequency resources of a CSI-RS in the vertical dimension are represented as {Sub-frame N}, and their corresponding antenna ports are antenna ports polarized in the same direction in the first column of antenna elements (as denoted by a thick solid line as illustrated). Time-frequency resources of a CSI-RS in the horizontal dimension are represented as S sub-frames in total, i.e., {Sub-frame N+a, Sub-frame N+a+1 . . . , Sub-frame N+a+S−1}. Antenna ports corresponding to the resources of a CSI-RS in the horizontal dimension are antenna ports of the fourth rows of antenna elements (as denoted by a thick solid line as illustrated).

The set A includes S vertical-dimension beam-forming weights with their corresponding PMIs represented as {PMI1, PMI2 . . . , PMIS}, and the correspondence relationship between the beam-forming weights in the vertical dimension in the set A, and the CSI-RS resources in the horizontal dimension is as illustrated. The set A is configured at the terminal side as a codebook for the terminal to measure and teed back a CSI-RS in the vertical dimension.

In a periodicity T, the base station transmits a CSI-RS in the vertical dimension via the antenna ports corresponding to the CSI-RS resources in the vertical dimension in the sub-frame N, and a CSI-RS in the horizontal dimension via the antenna ports corresponding to the CSI-RS resources in the horizontal dimension in the S sub-frames in total including the sub-frame N+a, the sub-frame N+a+1 . . . , the sub-frame N+a+S−1. The terminal measures the CSI-RS in the vertical dimension in the sub-frame N, obtains the PMI2, determines the sub-frame N+a+1, according to the PMI2, in which to receive the CSI-RS in the horizontal dimension, and measures and feeds back channel state information therein.

In order to make the embodiments above of the application more apparent, particular implementations in the three instances of N=S, N>S, and N<S will be described below respectively in connection with their particular embodiments.

(1) In the instance of N=S:

the set A is {vertical-dimension beam-forming weight 1 (PMI1), vertical-dimension beam-forming weight 2 (PMI2) . . . , vertical-dimension beam-forming weight N (PMIN)};

the first correspondence relationship is that the vertical-dimension beam-forming weight 1 (PMI1) corresponds to the horizontal-dimension CSI-RS resource 1, the vertical-dimension beam-forming weight 2 (PMI2) corresponds to the horizontal-dimension CSI-RS resource 2 . . . , and the vertical-dimension beam-forming weight N (PMIN) corresponds to the horizontal-dimension CSI-RS resource N.

At the base station side, beam-forming is performed on a horizontal-dimension CSI-RS as follows:

beam-forming is performed on a CS-RS transmitted over the horizontal-dimension CSI-RS resource 1 using the vertical-dimension beam-forming weight 1;

beam-forming is performed on a CS-RS transmitted over the horizontal-dimension CSI-RS resource 2 using the vertical-dimension beam-forming weight 2;

. . . ; and beam-forming is performed on a CS-RS transmitted over the horizontal-dimension CSI-RS resource N using the vertical-dimension beam-forming weight N.

At the terminal side, the PMI1 is obtained by measuring the vertical-dimension CSI-RS, the first correspondence relationship is referred to using the PMI1 to obtain the horizontal-dimension CSI-RS resource 1, and the horizontal-dimension CSI-RS beam-formed using the vertical-dimension beam-forming weight 1 corresponding to the PMI1 is received and measured over the horizontal-dimension CSI-RS resource 1 to obtain and then feed hack Channel State information (CSI).

(2) In the instance of N>S:

in a first embodiment: the set A is {vertical-dimension beam-forming weight 1 (PMI1), vertical-dimension beam-forming weight 2 (PMI2) . . . , vertical-dimension beam-forming weight N (PMIN)}; the first correspondence relationship is that the vertical-dimension beam-forming weight 1 and the vertical-dimension beam-forming weight 2 (PMI1 and PMI2) correspond to the horizontal-dimension CSI-RS resource 1, the vertical-dimension beam-forming weight 3 (PMI3) corresponds to the horizontal-dimension CSI-RS resource 2 . . . , where the vertical-dimension beam-forming weight 1 and the vertical-dimension beam-forming weight 2 are highly correlated, and the vertical-dimension beam-forming weight 2 will not be used for beam-forming on any horizontal-dimension CSI-RS.

At the base station side, beam-forming is performed on a horizontal-dimension CSI-RS as follows:

beam-forming is performed on a CSI-RS transmitted over the horizontal-dimension CSI-RS resource 1 using the vertical-dimension beam-forming weight 1;

beam-forming is performed on a CSI-RS transmitted over the horizontal-dimension CSI-RS resource 2 using the vertical-dimension beam-forming weight 3;

. . .

At a first terminal side, the PMI1 is obtained by measuring the vertical-dimension CSI-RS, the first correspondence relationship is referred to using the PMI1 to obtain the horizontal-dimension CSI-RS resource 1, and the horizontal-dimension CSI-RS beam-formed using the vertical-dimension beam-forming weight 1 is received and measured over the horizontal-dimension CSI-RS resource 1 to obtain and then feed back CSI.

At a second terminal side, the PMI2 is obtained by measuring the vertical-dimension CSI-RS, the first correspondence relationship is referred to using the PMI2 to obtain the horizontal-dimension CSI-RS resource 1, and the horizontal-dimension CSI-RS beam-formed using the vertical-dimension beam-forming weight 1 is received and measured over the horizontal-dimension CSI-RS resource 1 to obtain and then feed back CSI.

In a second embodiment:

the set A is {vertical-dimension beam-forming weight 1 (PMI1), vertical-dimension beam-forming weight 2 (PMI2) . . . , vertical-dimension beam-forming weight N (PMIN)};

the first correspondence relationship is that the vertical-dimension beam-forming weight 1 (PMI1) corresponds to the horizontal-dimension CSI-RS resource 1, the vertical-dimension beam-forming weight 3 (PMI3) corresponds to the horizontal-dimension CSI-RS resource 2 . . . , where the vertical-dimension beam-forming weight 1 and the vertical-dimension beam-forming weight 2 are highly correlated, and the vertical-dimension beam-forming weight 2 will not be used for beam-forming on any horizontal-dimension CSI-RS.

At the base station side, beam-forming is performed on a horizontal-dimension CSI-RS as follows:

beam-forming is performed on a reference signal transmitted over the horizontal-dimension CSI-RS resource 1 using the vertical-dimension beam-forming weight 1;

beam-forming is performed on a reference signal transmitted over the horizontal-dimension CSI-RS resource 2 using the vertical-dimension beam-forming weight 3;

. . .

At the first terminal side, the PMI1 is obtained by measuring the vertical-dimension CSI-RS, the first correspondence relationship is referred to using the PMI1 to obtain the horizontal-dimension CSI-RS resource 1, and the horizontal-dimension CSI-RS beam-formed using the vertical-dimension beam-forming weight 1 is received and measured over the horizontal-dimension CSI-RS resource 1 to obtain and then feed back CSI.

At the second terminal side, the PMI2 is obtained by measuring the vertical-dimension CSI-RS, the first correspondence relationship is referred to using the PMI2, but there is a failure, so the correlations of the first-dimension beam-forming weight corresponding to the PMI2 with the first-dimension beam-forming weights in the first correspondence relationship are calculated, and it is determined that the correlation with the first-dimension beam-forming weight indicated by the PMI1 in the first correspondence relationship is the highest, so that the horizontal-dimension CSI-RS beam-formed using the vertical-dimension beam-forming weight 1 is received and measured over the horizontal-dimension CSI-RS resource 1 corresponding to the PMI1 to obtain and then feed back CSI.

(3) In the instance of N<S:

the set A is {vertical-dimension beam-forming weight 1 (PMI1), vertical-dimension beam-forming weight 2 (PMI2) . . . , vertical-dimension beam-forming weight N (PMIN)}.

the set B is {vertical-dimension beam-forming weight 1 (PMI1), vertical-dimension beam-forming weight 2 (PMI2) . . . , vertical-dimension beam-forming weight N (PMIN), vertical-dimension beam-forming weight N+1, (PMIN+1) . . . , vertical-dimension beam-forming weight S (PMIs)}.

The first correspondence relationship is that the vertical-dimension beam-forming weight 1 (PMI1) corresponds to the horizontal-dimension CSI-RS resource 1, the vertical-dimension beam-forming weight 2 (PMI2) correspond to the horizontal-dimension CSI-RS resource 2 . . . , and the vertical-dimension beam-forming weight S (PMIs) correspond to the horizontal-dimension CSI-RS resource S.

The second correspondence relationship is that the PMI1 in the set A corresponds to the PMI1 and the PMI2 in the set B, the PMI2 in the set A corresponds to the PMI3 in the set B, . . . .

At the base station side, beam-forming is performed on a horizontal-dimension CSI-RS as follows:

beam-forming is performed on a CSI-RS transmitted over the horizontal-dimension CSI-RS resource 1 using the vertical-dimension beam-forming weight 1 in the set B;

beam-forming is performed on a CSI-RS transmitted over the horizontal-dimension CSI-RS resource 2 using the vertical-dimension beam-forming weight 2 in the set B;

. . . ; and beam-forming is performed on a CSI-RS transmitted over the horizontal-dimension CSI-RS resource S using the vertical-dimension beam-forming weight S in the set B.

At the first terminal side, the PMI1 in the set A is obtained by measuring the vertical-dimension CSI-RS, the PMI1 in the set A is mapped to the PMI1 and the PMI2 in the set B according to the correspondence relationship between the set A and the set B, the first correspondence relationship is further referred to using the PMI1 and the PMI2 in the set B to obtain the horizontal-dimension CSI-RS resources 1 and 2, and the horizontal-dimension CSI-RS beam-formed using the vertical-dimension beam-forming weights 1 and 2 in the set B is received and measured over these two resources to obtain and then feed back CSI.

At the second terminal side, the PMI2 in the set A is obtained by measuring the vertical-dimension CSI-RS, the PMI2 in the set A is mapped to the PMI3 in the set B according to the correspondence relationship between the set A and the set B, the first correspondence relationship is further referred to using the PMI3 in the set B to obtain the horizontal-dimension CSI-RS resource 3, and the horizontal-dimension CSI-RS beam-formed using the vertical-dimension beam-forming weight 3 in the set B is received and measured over the resource to obtain and then feed back CSI.

Based upon the same technical idea, an embodiment of the application provides a terminal.

Figure 5:
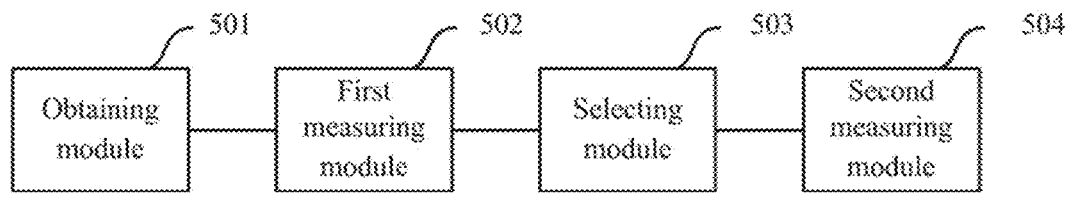
FIG. 5 is a schematic structural diagram of a terminal according to an embodiment of the application.

Referring to FIG. 5, there is illustrated a schematic structural diagram of a terminal according to an embodiment of the application. The terminal can include an obtaining module 501, a first measuring module 502, a selecting module 503, and a second measuring module 504.

The obtaining module 501 is configured to obtain one first-dimension downlink reference signal resource, S second-dimension downlink reference signal resources, and a first correspondence relationship, configured by a network device, where the first correspondence relationship includes a correspondence relationship between the S second-dimension downlink reference signal resources and N first-dimension beam-forming weights, and both S and N are integers greater than 1.

The first measuring module 502 is configured to measure a first-dimension downlink reference signal according to the first-dimension downlink reference signal resource to obtain a first-dimension PMI, wherein the first-dimension PMI indicates one of the N first-dimension beam-forming weights.

The selecting module 503 is configured to select one of the S second-dimension downlink reference signal resources for measuring a second-dimension downlink reference signal, according to the obtained first-dimension PMI and the first correspondence relationship.

The second measuring module 504 is configured to measure the second-dimension downlink reference signal, and feed back channel state information, according to the selected resource for measuring the second-dimension downlink reference signal, where the second-dimension downlink reference signal transmitted over the selected second-dimension downlink reference signal resource is transmitted after being beam-formed using the first-dimension beam-forming weight corresponding to the resource.

If N is equal to S, then each first-dimension beam-forming weight will correspond to one of the second-dimension downlink reference signal resources in the first correspondence relationship.

If N is greater than S, then in the first correspondence relationship, at least one of the second-dimension downlink reference signal resources will correspond to a plurality of first-dimension beam-forming weights; and one of the plurality of first-dimension beam-forming weights will be used for beam-forming on the downlink reference signal transmitted over the second-dimension downlink reference signal resource, the other first-dimension beam-forming weights will not be used for beam-forming on any downlink reference signal, and a correlation metric between the other first-dimension beam-forming weights, and the first-dimension beam-forming weight for beam-forming on the downlink reference signal transmitted over the second-dimension downlink reference signal resource will be greater than a threshold.

Accordingly in the two instances above, the selecting module 503 can be configured: to refer to the first correspondence relationship using the obtained first-dimension PMI, to obtain the second-dimension downlink reference signal resource uniquely corresponding to the first-dimension PMI, and to determine the obtained second-dimension downlink reference signal resource as the resource for measuring the second-dimension downlink reference signal.

If N is greater than S, then each of the S first-dimension beam-forming weights among the N first-dimension beam-forming weights will correspond respectively to one of the second-dimension downlink reference signal resources in the first correspondence relationship.

Accordingly the selecting module 503 can be configured: to refer to the first correspondence relationship using the obtained first-dimension PMI; and if a second-dimension downlink reference signal resource corresponding to the first-dimension PMI is found, to determine the found second-dimension downlink reference signal resource as the resource for measuring the second-dimension downlink reference signal; or if no second-dimension downlink reference signal resource corresponding to the first-dimension PMI is found, to select one of the S first-dimension beam-forming weights according to the correlations between these S first-dimension beam-forming weights, and the first-dimension beam-forming weight indicated by the first-dimension PMI, to refer to the first correspondence relationship for the second-dimension downlink reference signal resource corresponding to the selected first-dimension beam-forming weight, and to determine the found second-dimension downlink reference signal resource as the resource for measuring the second-dimension downlink reference signal.

If N is less than S, then each first-dimension beam-forming weight will correspond to one of the second-dimension downlink reference signal resources in the first correspondence relationship, and all the first-dimension beam-forming weights corresponding to the second-dimension downlink reference signal resources in the first correspondence relationship will belong to a second set, where the second set includes at least S first-dimension beam-forming weights, and there is a second correspondence relationship between the first-dimension beam-forming weights in the second set, and first-dimension beam-forming weights in a first set, at least one of the first-dimension beam-forming weights in the first set corresponds to more than one of the first-dimension beam-forming weights in the second set, and the first set includes all of the N first-dimension beam-forming weights, and is configured in the terminal as a codebook for measuring the first-dimension downlink reference signal.

Accordingly the obtaining module 501 can be further configured: to obtain the second correspondence relationship configured by the network device. The selecting module 503 can be configured: to refer to the second correspondence relationship using the obtained first-dimension PMI, and to obtain a first-dimension beam-forming weight in the second set corresponding to the first-dimension PMI, where the first-dimension PMI indicates a first-dimension beam-forming weight in the first set; and to refer to the first correspondence relationship using the obtained first-dimension beam-forming weight in the second set, to obtain the corresponding second-dimension downlink reference signal resource, and to determine the obtained second-dimension downlink reference signal resource as the resource for measuring the second-dimension downlink reference signal.

Preferably the channel state information fed back by the second measuring module 504 after measuring the second-dimension downlink reference signal includes the index of the selected second-dimension downlink reference signal resource for measuring the second-dimension downlink reference signal, and a second-dimension PMI, a RI, and a CQI obtained by measuring the second-dimension downlink reference signal according to the selected resource for measuring the second-dimension downlink reference signal.

Preferably the second measuring module 504 can be further configured: to feed the obtained first-dimension PMI back to the network device after obtaining the first-dimension PMI.

Based upon the same technical idea, an embodiment of the application provides a network device.

Figure 6:
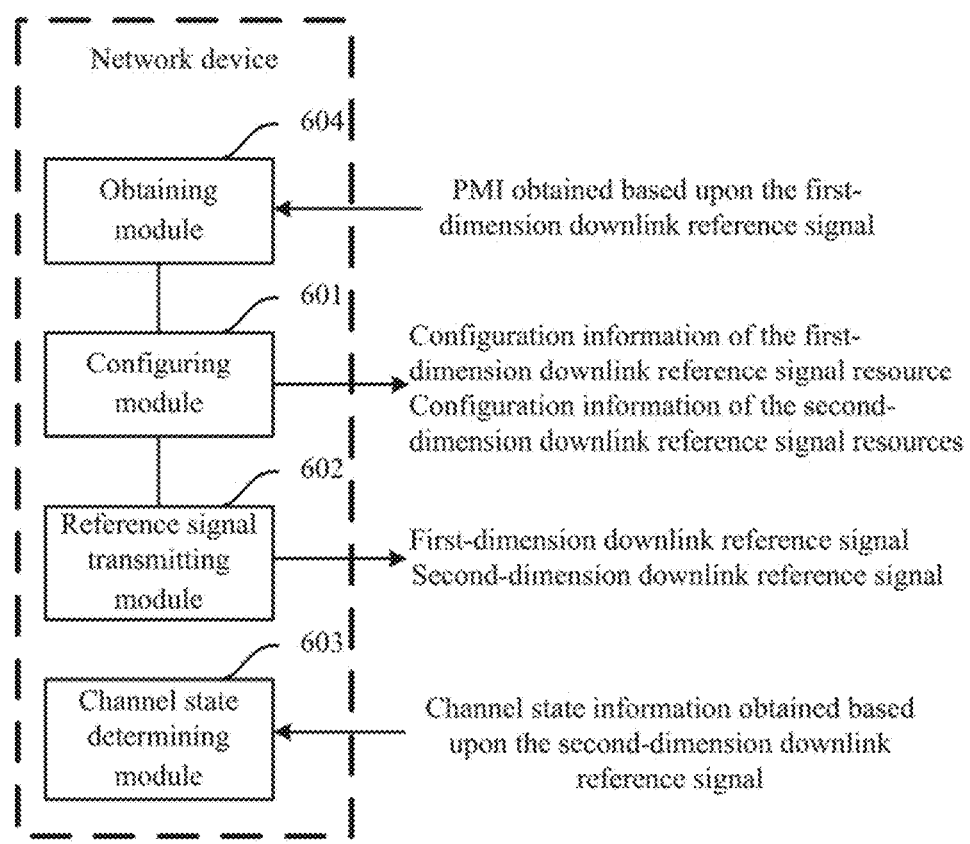
FIG. 6 is a schematic structural diagram of a network device according to an embodiment of the application.

Referring to FIG. 6, there is illustrated a schematic structural diagram of a network device according to an embodiment of the application. The network device can include a configuring module 601, a reference signal transmitting module 602, and a channel state determining module 603, and can further include an obtaining module 604.

The configuring module 601 is configured to configure a terminal with one first-dimension downlink reference signal resource, S second-dimension downlink reference signal resources, and a first correspondence relationship including a correspondence relationship between the S second-dimension downlink reference signal resources and N first-dimension beam-forming weights, where both S and N are integers greater than 1.

The reference signal transmitting module 602 is configured to transmit a first-dimension downlink reference signal according to the first-dimension downlink reference signal resource, and to transmit second-dimension downlink reference signals according to the second-dimension downlink reference signal resources, where the second-dimension downlink reference signal transmitted over each second-dimension downlink reference signal resource is transmitted after being beam-formed using the first-dimension beam-forming weight corresponding to the resource.

The channel state determining module 603 is configured to receive channel state information measured and fed back by the terminal using the second-dimension downlink reference signal, and to obtain a channel state of the terminal from the channel state information, where the channel state information is obtained by the terminal by selecting one of the S second-dimension downlink reference signal resources for measuring the second-dimension downlink reference signal, according to a first-dimension PMI obtained by measuring the first-dimension downlink reference signal, and the first correspondence relationship, and then measuring the second-dimension downlink reference signal according to the selected second-dimension downlink reference signal resource, and the first-dimension PMI indicates one of the N first-dimension beam-forming weights.

Preferably the channel state information fed back by the terminal after measuring the second-dimension downlink reference signal includes the index of the selected second-dimension downlink reference signal resource for measuring the second-dimension downlink reference signal, and a second-dimension PMI, a RI, and a CQI obtained by measuring the second-dimension downlink reference signal according to the selected resource for measuring the second-dimension downlink reference signal.

Accordingly the channel state determining module 603 can be configured: to determine the first-dimension beam-forming weight corresponding to the second-dimension downlink reference signal resource according to the index of the second-dimension downlink reference signal resource, and the first correspondence relationship; and to combine a pre-coding matrix indicated by the second-dimension PMI with the determined first-dimension beam-forming weight into a pre-coding matrix of the terminal.

Furthermore the obtaining module 604 can receive first-dimension PMIs fed back by terminals in a coverage area of the network device. Accordingly the configuring module 601 can further perform one or more of the following first operation to third operation according to the first-dimension PIM fed back by the terminals in the coverage area of the network device.

In a first operation, in the instance of N>S, the configuring module 601 selects the S first-dimension beam-forming weights from the N first-dimension beam-forming weights to perform beam-forming on the downlink reference signals transmitted over the S second-dimension downlink reference signal resources.

In a second operation, in the instance of N>S, after the configuring module 601 selects the S first-dimension beam-forming weights from the N first-dimension beam-forming weights to perform beam-forming on the downlink reference signals transmitted over the S second-dimension downlink reference signal resources, the configuring module 601 determines a distribution of the terminals according to the first-dimension PMIs fed back by the terminals in the coverage area of the network device, reselects the S first-dimension beam-forming weights from the N first-dimension beam-forming weights according to the distribution of the terminals to perform beam-forming on the downlink reference signals transmitted over the S second-dimension downlink reference signal resources, and notifies a correspondence relationship between the reselected S first-dimension beam-forming weights, and the S second-dimension downlink reference signal resources to the terminals.

In a third operation, the configuring module 601 determines a distribution of the terminals in the coverage area of the network device in the first dimension, and adjusts the first-dimension beam-forming weights according to the distribution of the terminals in the coverage area of the network device in the first dimension.

If N is equal to S, then each first-dimension beam-forming weight will correspond to one of the second-dimension downlink reference signal resources in the first correspondence relationship.

If N is greater than S, then in the first correspondence relationship, at least one of the second-dimension downlink reference signal resources will correspond to a plurality of first-dimension beam-forming weights; and one of the plurality of first-dimension beam-forming weights will be used for beam-forming on the downlink reference signal transmitted over the second-dimension downlink reference signal resource, the other first-dimension beam-forming weights will not be used for beam-forming on any downlink reference signal, and a correlation metric between the other first-dimension beam-forming weights, and the first-dimension beam-forming weight for beam-forming on the downlink reference signal transmitted over the second-dimension downlink reference signal resource will be greater than a threshold.

If N is greater than S, then each of the S first-dimension beam-forming weights among the N first-dimension beam-forming weights will correspond respectively to one of the second-dimension downlink reference signal resources in the first correspondence relationship.

If N is less than S, then each first-dimension beam-forming weight will correspond to one of the second-dimension downlink reference signal resources in the first correspondence relationship, and all the first-dimension beam-forming weights corresponding to the second-dimension downlink reference signal resources in the first correspondence relationship will belong to a second set, where the second set includes at least S first-dimension beam-forming weights, and there is a second correspondence relationship between the first-dimension beam-forming weights in the second set, and first-dimension beam-forming weights in a first set, at least one of the first-dimension beam-forming weights in the first set corresponds to more than one of the first-dimension beam-forming weights in the second set, and the first set includes all of the N first-dimension beam-forming weights, and is configured in the terminal as a codebook for measuring the first-dimension downlink reference signal.

Based upon the same technical idea, an embodiment of the application further provides a terminal.

Figure 7:
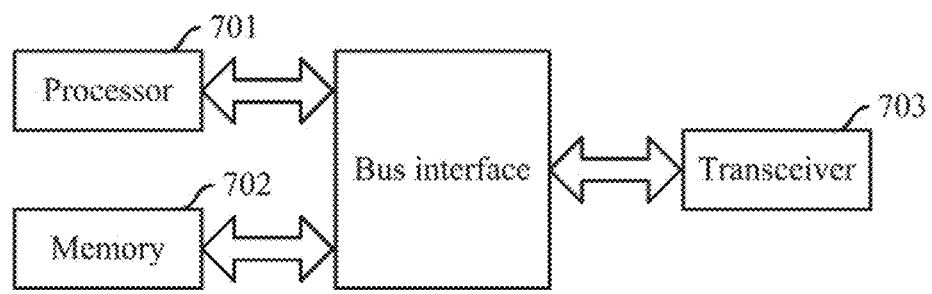
FIG. 7 is a schematic structural diagram of a terminal according to another embodiment of the application.
Figure 8:
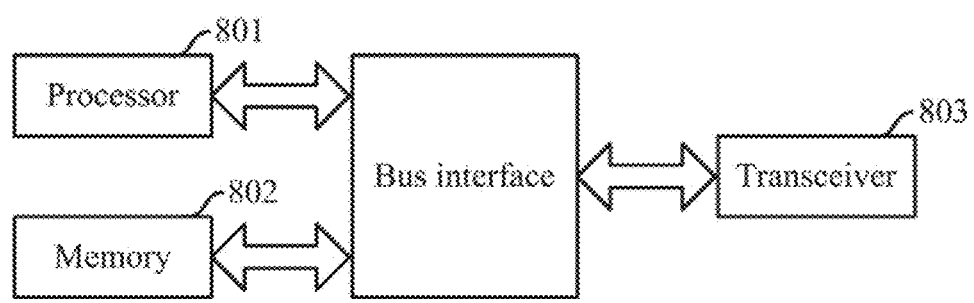
FIG. 8 is a schematic structural diagram of a network device according to another embodiment of the application.

Referring to FIG. 7, there is illustrated a schematic structural diagram of a terminal according to an embodiment of the application. The terminal can include a processor 701, a memory 702, a transceiver 703, and a bus interface.

The processor 701 is responsible for managing a bus architecture and for general processes, the memory 702 can store data for use by the processor 701 in performing operations, and the transceiver 703 is configured to be controlled by the processor 701 to transmit and receive data.

The bus architecture can include any number of interconnecting buses and bridges to particularly link together various circuits including one or more processors represented by the processor 701 and one or more memories represented by the memory 702. The bus architecture can further link together various other circuits, e.g., peripheral devices, manostats, power management circuits, etc., all of which are well known in the art, so a further description thereof will be omitted in this context. The bus interface serves as an interface. The transceiver 703 can be a number of elements including a transmitter and a receiver which are units for communication with various other devices over a transmission medium. The processor 701 is responsible for managing the bus architecture and performing normal processes, and the memory 702 can store data for use by the processor 701 in performing the operations.

The processor 701 is configured to execute programs in the memory 702:

to obtain one first-dimension downlink reference signal resource, S second-dimension downlink reference signal resources, and a first correspondence relationship, configured by a network device, where the first correspondence relationship includes a correspondence relationship between the S second-dimension downlink reference signal resources and N first-dimension beam-forming weights, and both S and N are integers greater than 1;

to measure a first-dimension downlink reference signal according to the first-dimension downlink reference signal resource to obtain a first-dimension Pre-coding matrix Indicator (PMI), wherein the first-dimension PMI indicates one of the N first-dimension beam-forming weights;

to select one of the S second-dimension downlink reference signal resources for measuring a second-dimension downlink reference signal, according to the obtained first-dimension PMI and the first correspondence relationship; and to measure the second-dimension downlink reference signal, and feed back channel state information, according to the selected resource for measuring the second-dimension downlink reference signal, where the second-dimension downlink reference signal transmitted over the selected second-dimension downlink reference signal resource is transmitted after being beam-formed using the first-dimension beam-forming weight corresponding to the resource.

If N is equal to S, then each first-dimension beam-forming weight will correspond to one of the second-dimension downlink reference signal resources in the first correspondence relationship.

If N is greater than S, then in the first correspondence relationship, at least one of the second-dimension downlink reference signal resources will correspond to a plurality of first-dimension beam-forming weights; and one of the plurality of first-dimension beam-forming weights will be used for beam-forming on the downlink reference signal transmitted over the second-dimension downlink reference signal resource, the other first-dimension beam-forming weights will not be used for beam-forming on any downlink reference signal, and a correlation metric between the other first-dimension beam-forming weights, and the first-dimension beam-forming weight for beam-forming on the downlink reference signal transmitted over the second-dimension downlink reference signal resource will be greater than a threshold.

Accordingly in the two instances above, the processor 701 can be configured: to refer to the first correspondence relationship using the obtained first-dimension PMI, to obtain the second-dimension downlink reference signal resource uniquely corresponding to the first-dimension PMI, and to determine the obtained second-dimension downlink reference signal resource as the resource for measuring the second-dimension downlink reference signal.

If N is greater than S, then each of the S first-dimension beam-forming weights among the N first-dimension beam-forming weights will correspond respectively to one of the second-dimension downlink reference signal resources in the first correspondence relationship.

Accordingly the processor 701 can be configured: to refer to the first correspondence relationship using the obtained first-dimension PMI; and if a second-dimension downlink reference signal resource corresponding to the first-dimension PMI is found, to determine the found second-dimension downlink reference signal resource as the resource for measuring the second-dimension downlink reference signal; or if no second-dimension downlink reference signal resource corresponding to the first-dimension PMI is found, to select one of the S first-dimension beam-forming weights according to the correlations between these S first-dimension beam-forming weights, and the first-dimension beam-forming weight indicated by the first-dimension PMI, to refer to the first correspondence relationship for the second-dimension downlink reference signal resource corresponding to the selected first-dimension beam-forming weight, and to determine the found second-dimension downlink reference signal resource as the resource for measuring the second-dimension downlink reference signal.

If N is less than S, then each first-dimension beam-forming weight will correspond to one of the second-dimension downlink reference signal resources in the first correspondence relationship, and all the first-dimension beam-forming weights corresponding to the second-dimension downlink reference signal resources in the first correspondence relationship will belong to a second set, where the second set includes at least S first-dimension beam-forming weights, and there is a second correspondence relationship between the first-dimension beam-forming weights in the second set, and first-dimension beam-forming weights in a first set, at least one of the first-dimension beam-forming weights in the first set corresponds to more than one of the first-dimension beam-forming weights in the second set, and the first set includes all of the N first-dimension beam-forming weights, and is configured in the terminal as a codebook for measuring the first-dimension downlink reference signal.

Accordingly the processor 701 can be further configured: to obtain the second correspondence relationship configured by the network device through the transceiver 703. Furthermore the processor 701 can be configured: to refer to the second correspondence relationship using the obtained first-dimension PMI, and to obtain a first-dimension beam-forming weight in the second set corresponding to the first-dimension PMI, where the first-dimension PMI indicates a first-dimension beam-forming weight in the first set; and to refer to the first correspondence relationship using the obtained first-dimension beam-forming weight in the second set, to obtain the corresponding second-dimension downlink reference signal resource, and to determine the obtained second-dimension downlink reference signal resource as the resource for measuring the second-dimension downlink reference signal.

Preferably the channel state information fed back by the processor 701 through the transceiver 703 after measuring the second-dimension downlink reference signal includes the index of the selected second-dimension downlink reference signal resource for measuring the second-dimension downlink reference signal, and a second-dimension PMI, a RI, and a CQI obtained by measuring the second-dimension downlink reference signal according to the selected resource for measuring the second-dimension downlink reference signal.

Preferably the processor 701 can be further configured: to feed the obtained first-dimension nil back to the network device after obtaining the first-dimension PMI.

Based upon the same technical idea, an embodiment of the application further provides a network device.

Referring to there is illustrated a schematic structural diagram of a network device according to an embodiment of the application. The network device can include a processor 801, a memory 802, a transceiver 803, and a bus interface.

The processor 801 is responsible for managing a bus architecture and for general processes, the memory 802 can store data for use by the processor 801 in performing operations, and the transceiver 803 is configured to be controlled by the processor 801 to transmit and receive data.

The bus architecture can include any number of interconnecting buses and bridges to particularly link together various circuits including one or more processors represented by the processor 801, and one or more memories represented by the memory 802. The bus architecture can further link together various other circuits, e.g., peripheral devices, manostats, power management circuits, etc., all of which are well known in the art, so a further description thereof will be omitted in this context. The bus interface serves as an interface. The transceiver 803 can be a number of elements including a transmitter and a receiver which are units for communication with various other devices over a transmission medium. The processor 801 is responsible for managing the bus architecture and performing normal processes, and the memory 802 can store data for use by the processor 801 in performing the operations.

The processor 801 is configured to execute programs in the memory 802:

to configure a terminal with one first-dimension downlink reference signal resource, S second-dimension downlink reference signal resources, and a first correspondence relationship including a correspondence relationship between the S second-dimension downlink reference signal resources and N first-dimension beam-forming weights, where both S and N are integers greater than 1;

to transmit a first-dimension downlink reference signal according to the first-dimension downlink reference signal resource, and to transmit second-dimension downlink reference signals according to the second-dimension downlink reference signal resources, where the second-dimension downlink reference signal transmitted over each second-dimension downlink reference signal resource is transmitted after being beam-formed using the first-dimension beam-forming weight corresponding to the resource; and to receive channel state information measured and fed back by the terminal using the second-dimension downlink reference signal, and to obtain a channel state of the terminal from the channel state information, where the channel state information is obtained by the terminal by selecting one of the S second-dimension downlink reference signal resources for measuring the second-dimension downlink reference signal, according to a first-dimension PMI obtained by measuring the first-dimension downlink reference signal, and the first correspondence relationship, and then measuring the second-dimension downlink reference signal according to the selected second-dimension downlink reference signal resource, and the first-dimension PMI indicates one of the N first-dimension beam-forming weights.

Preferably the channel state information fed back by the terminal after measuring the second-dimension downlink reference signal includes the index of the selected second-dimension downlink reference signal resource for measuring the second-dimension downlink reference signal, and a second-dimension PMI, a RI, and a CQI obtained by measuring the second-dimension downlink reference signal according to the selected resource for measuring the second-dimension downlink reference signal.

Accordingly the processor 801 can be configured: to determine the first-dimension beam-forming weight corresponding to the second-dimension downlink reference signal resource according to the index of the second-dimension downlink reference signal resource, and the first correspondence relationship; and to combine a pre-coding matrix indicated by the second-dimension PMI with the determined first-dimension beam-forming weight into a pre-coding matrix of the terminal.

Furthermore the processor 801 can receive first-dimension PMIs fed back by terminals in a coverage area of the network device. Accordingly the processor 801 can further perform one or more of the following first operation to third operation according to the first-dimension PMIs fed back by the terminals in the coverage area of the network device.

In a first operation, in the instance of N>S, the processor 801 selects the S first-dimension beam-forming weights from the N first-dimension beam-forming weights to perform beam-forming on the downlink reference signals transmitted over the S second-dimension downlink reference signal resources.

In a second operation, in the instance of N>S, after the processor 801 selects the S first-dimension beam-forming weights from the N first-dimension beam-forming weights to perform beam-forming on the downlink reference signals transmitted over the S second-dimension downlink reference signal resources, the processor 801 determines a distribution of the terminals according to the first-dimension PMIs fed back by the terminals in the coverage area of the network device, reselects the S first-dimension beam-forming weights from the N first-dimension beam-forming weights according to the distribution of the terminals to perform beam-forming on the downlink reference signals transmitted over the S second-dimension downlink reference signal resources, and notifies a correspondence relationship between the reselected S first-dimension beam-forming weights, and the S second-dimension downlink reference signal resources to the terminals.

In a third operation, the processor 801 determines a distribution of the terminals in the coverage area of the network device in the first dimension, and adjusts the first-dimension beam-forming weights according to the distribution of the terminals in the coverage area of the network device in the first dimension.

If N is equal to S, then each first-dimension beam-forming weight will correspond to one of the second-dimension downlink reference signal resources in the first correspondence relationship.

If N is greater than S, then in the first correspondence relationship, at least one of the second-dimension downlink reference signal resources will correspond to a plurality of first-dimension beam-forming weights; and one of the plurality of first-dimension beam-forming weights will be used for beam-forming on the downlink reference signal transmitted over the second-dimension downlink reference signal resource, the other first-dimension beam-forming weights will not be used for beam-forming on any downlink reference signal, and a correlation metric between the other first-dimension beam-forming weights, and the first-dimension beam-forming weight for beam-forming on the downlink reference signal transmitted over the second-dimension downlink reference signal resource will be greater than a threshold.

If N is greater than S, then each of the S first-dimension beam-forming weights among the N first-dimension beam-forming weights will correspond respectively to one of the second-dimension downlink reference signal resources in the first correspondence relationship.

If N is less than S, then each first-dimension beam-forming weight will correspond to one of the second-dimension downlink reference signal resources in the first correspondence relationship, and all the first-dimension beam-forming weights corresponding to the second-dimension downlink reference signal resources in the first correspondence relationship will belong to a second set, where the second set includes at least S first-dimension beam-forming weights, and there is a second correspondence relationship between the first-dimension beam-forming weights in the second set, and first-dimension beam-forming weights in a first set, at least one of the first-dimension beam-forming weights in the first set corresponds to more than one of the first-dimension beam-forming weights in the second set, and the first set includes all of the N first-dimension beam-forming weights, and is configured in the terminal as a codebook for measuring the first-dimension downlink reference signal.

In summary, if the first dimension is the vertical dimension, and the second dimension is the horizontal dimension, then in the embodiments of the application, Reference Signal Received Power (RSRP) may not be measured over all the horizontal-dimension CSI-RS resources to thereby avoid the base station from notifying the terminal in higher-layer signaling about those horizontal-dimension CSI-RS resources for a feedback, where the fed-back horizontal-dimension channel state information includes a vertical gain to thereby improve the accuracy of the channel state information, and furthermore the direction of a vertical beam can be adjusted duly.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the application have been described, those skilled in the art benefiting from the underlying inventive concept can make additional modifications and variations to these embodiments. Therefore the appended claims are intended to be construed as encompassing the preferred embodiments and all the modifications and variations coming into the scope of the application.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A method for feeding back channel state information, the method comprising:

obtaining, by a terminal, one first-dimension downlink reference signal resource, S second-dimension downlink reference signal resources, and a first correspondence relationship, configured by a network device, wherein the first correspondence relationship comprises a correspondence relationship between the S second-dimension downlink reference signal resources and N first-dimension beam-forming weights, and both S and N are integers greater than 1;

measuring, by the terminal, a first-dimension downlink reference signal according to the first-dimension downlink reference signal resource to obtain a first-dimension Pre-coding matrix Indicator (PMI), wherein the first-dimension PMI indicates one of the N first-dimension beam-forming weights;

selecting, by the terminal, a second-dimension downlink reference signal resource from the S second-dimension downlink reference signal resources for measuring a second-dimension downlink reference signal, according to the first-dimension PMI and the first correspondence relationship; and measuring, by the terminal, the second-dimension downlink reference signal, and feeding back channel state information, according to the selected second-dimension downlink reference signal resource for measuring the second-dimension downlink reference signal, wherein the second-dimension downlink reference signal transmitted over the selected second-dimension downlink reference signal resource is transmitted after being beam-formed using a first-dimension beam-forming weight corresponding to the selected second-dimension downlink reference signal resource.

2. The method according to claim 1, wherein if N is equal to S, then each first-dimension beam-forming weight corresponds to one of the S second-dimension downlink reference signal resources in the first correspondence relationship; or if N is greater than S, then in the first correspondence relationship, at least one of the S second-dimension downlink reference signal resources corresponds to a plurality of first-dimension beam-forming weights; and one of the plurality of first-dimension beam-forming weights is used for beam-forming on a downlink reference signal transmitted over the one of the S second-dimension downlink reference signal resources, the other first-dimension beam-forming weights of the plurality of first-dimension beam-forming weights are not be used for beam-forming on any downlink reference signal, and a correlation metric between the other first-dimension beam-forming weights, and the one of the plurality of first-dimension beam-forming weights for beam-forming on the downlink reference signal transmitted over the one of the S second-dimension downlink reference signal resource is greater than a threshold.

3. The method according to claim 2, wherein selecting, by the terminal, the second-dimension downlink reference signal resource for measuring a second-dimension downlink reference signal, according to the first-dimension PMI and the first correspondence relationship comprises:
referring, by the terminal, to the first correspondence relationship using the first-dimension PMI, obtaining a second-dimension downlink reference signal resource corresponding to the first-dimension PMI, and determining the obtained second-dimension downlink reference signal resource as the second-dimension downlink reference signal resource for measuring the second-dimension downlink reference signal.

4. The method according to claim 1, wherein if N is greater than S, then each of S first-dimension beam-forming weights among the N first-dimension beam-forming weights corresponds respectively to one of the S second-dimension downlink reference signal resources in the first correspondence relationship;
wherein selecting, by the terminal, the second-dimension downlink reference signal resource for measuring a second-dimension downlink reference signal, according to the first-dimension PMI and the first correspondence relationship comprises:
referring, by the terminal, to the first correspondence relationship using the first-dimension PMI; and
if a second-dimension downlink reference signal resource corresponding to the first-dimension PMI is found, then determining the found second-dimension downlink reference signal resource as the second-dimension downlink reference signal resource for measuring the second-dimension downlink reference signal; or
if no second-dimension downlink reference signal resource corresponding to the first-dimension PMI is found, then selecting one of the S first-dimension beam-forming weights according to correlations between these S first-dimension beam-forming weights, and the first-dimension beam-forming weight indicated by the first-dimension PMI, referring to the first correspondence relationship for a second-dimension downlink reference signal resource corresponding to the selected first-dimension beam-forming weight, and determining a found second-dimension downlink reference signal resource as the second-dimension downlink reference signal resource for measuring the second-dimension downlink reference signal.

5. The method according to claim 1, wherein if N is less than S, then each first-dimension beam-forming weight corresponds to one of the S second-dimension downlink reference signal resources in the first correspondence relationship, and all the first-dimension beam-forming weights corresponding to the S second-dimension downlink reference signal resources in the first correspondence relationship belong to a second set; and
the second set comprises at least S first-dimension beam-forming weights, there is a second correspondence relationship between the first-dimension beam-forming weights in the second set, and first-dimension beam-forming weights in a first set, at least one of the first-dimension beam-forming weights in the first set corresponds to more than one of the first-dimension beam-forming weights in the second set, and the first set comprises all of the N first-dimension beam-forming weights, and is configured in the terminal as a codebook for measuring the first-dimension downlink reference signal.

6. The method according to claim 5, wherein the method further comprises:
obtaining, by the terminal, the second correspondence relationship configured by the network device; and
selecting, by the terminal, the second-dimension downlink reference signal resource for measuring a second-dimension downlink reference signal, according to the first-dimension PMI and the first correspondence relationship comprises:
referring, by the terminal, to the second correspondence relationship using the first-dimension PMI, and obtaining a first-dimension beam-forming weight in the second set corresponding to the first-dimension PMI, wherein the first-dimension PMI indicates a first-dimension beam-forming weight in the first set; and
referring, by the terminal, to the first correspondence relationship using the obtained first-dimension beam-forming weight in the second set, obtaining a corresponding second-dimension downlink reference signal resource, and determining the obtained second-dimension downlink reference signal resource as the second-dimension downlink reference signal resource for measuring the second-dimension downlink reference signal.

7. The method according to claim 1, wherein the channel state information fed back by the terminal after measuring the second-dimension downlink reference signal comprises an index of the selected second-dimension downlink reference signal resource for measuring the second-dimension downlink reference signal, and a second-dimension PMI, a Rank Indicator (RI), and a Channel Quality Indicator (CQI) obtained by measuring the second-dimension downlink reference signal according to the selected second-dimension downlink reference signal resource for measuring the second-dimension downlink reference signal.

8. The method according to claim 1, wherein after the terminal obtains the first-dimension PMI, the method further comprises:
feeding, by the terminal, the first-dimension PMI back to the network device.

9. A method for obtaining channel state information, the method comprising:
configuring, by a network device, a terminal with one first-dimension downlink reference signal resource, S second-dimension downlink reference signal resources, and a first correspondence relationship comprising a correspondence relationship between the S second-dimension downlink reference signal resources and N first-dimension beam-forming weights, wherein both S and N are integers greater than 1;

transmitting, by the network device, a first-dimension downlink reference signal according to the first-dimension downlink reference signal resource, and transmitting second-dimension downlink reference signals according to the S second-dimension downlink reference signal resources, wherein a second-dimension downlink reference signal transmitted over each of the S second-dimension downlink reference signal resources is transmitted after being beam-formed using a first-dimension beam-forming weight corresponding to each of the S second-dimension downlink reference signal resources; and receiving, by the network device, channel state information measured and fed back by the terminal using a second-dimension downlink reference signal among the second-dimension downlink reference signals, and obtaining a channel state of the terminal from the channel state information, wherein the channel state information is obtained by the terminal by selecting a second-dimension downlink reference signal resource from the S second-dimension downlink reference signal resources for measuring the second-dimension downlink reference signal, according to a first-dimension Pre-coding matrix Indicator (PMI) obtained by measuring the first-dimension downlink reference signal, and the first correspondence relationship, and then measuring the second-dimension downlink reference signal according to the selected second-dimension downlink reference signal resource, and the first-dimension PMI indicates one of the N first-dimension beam-forming weights.

10. The method according to claim 9, wherein the channel state information fed back by the terminal after measuring the second-dimension downlink reference signal comprises an index of the selected second-dimension downlink reference signal resource for measuring the second-dimension downlink reference signal, and a second-dimension PMI, a Rank Indicator (RI), and a Channel Quality Indicator (CQI) obtained by measuring the second-dimension downlink reference signal according to the selected second-dimension downlink reference signal resource for measuring the second-dimension downlink reference signal; and obtaining, by the network device, the channel state of the terminal from the channel state information comprises:
determining, by the network device, a first-dimension beam-forming weight corresponding to the selected second-dimension downlink reference signal resource according to the index of the selected second-dimension downlink reference signal resource, and the first correspondence relationship; and
combining, by the network device, a pre-coding matrix indicated by the second-dimension PMI with the determined first-dimension beam-forming weight into a pre-coding matrix of the terminal.

11. The method according to claim 9, wherein the method further comprises:
receiving, by the network device, first-dimension PMIs fed back by terminals in a coverage area of the network device; and
performing, by the network device, one or more of following first operation to third operation according to the first-dimension PMIs fed back by the terminals in the coverage area of the network device:

in a first operation, in an instance of N>S, selecting S first-dimension beam-forming weights from the N first-dimension beam-forming weights to perform beam-forming on downlink reference signals transmitted over the S second-dimension downlink reference signal resources;

in a second operation, in an instance of N>S, after selecting the S first-dimension beam-forming weights from the N first-dimension beam-forming weights to perform beam-forming on the downlink reference signals transmitted over the S second-dimension downlink reference signal resources, determining a distribution of the terminals according to the first-dimension PMIs fed back by the terminals in the coverage area of the network device, reselecting S first-dimension beam-forming weights from the N first-dimension beam-forming weights according to the distribution of the terminals to perform beam-forming on the downlink reference signals transmitted over the S second-dimension downlink reference signal resources, and notifying a correspondence relationship between the reselected S first-dimension beam-forming weights, and the S second-dimension downlink reference signal resources to the terminals;

in a third operation, determining a distribution of the terminals in the coverage area of the network device in a first dimension, and adjusting the first-dimension beam-forming weights according to the distribution of the terminals in the coverage area of the network device in the first dimension.

12. The method according to claim 9, wherein if N is equal to S, then each first-dimension beam-forming weight corresponds to one of the S second-dimension downlink reference signal resources in the first correspondence relationship; or if N is greater than S, then in the first correspondence relationship, at least one of the S second-dimension downlink reference signal resources corresponds to a plurality of first-dimension beam-forming weights; and one of the plurality of first-dimension beam-forming weights is used for beam-forming on a downlink reference signal transmitted over the one of the S second-dimension downlink reference signal resources, the other first-dimension beam-forming weights of the plurality of first-dimension beam-forming weights are not be used for beam-forming on any downlink reference signal, and a correlation metric between the other first-dimension beam-forming weights, and the one of the plurality of first-dimension beam-forming weights for beam-forming on the downlink reference signal transmitted over the one of the S second-dimension downlink reference signal resources is greater than a threshold, or if N is greater than S, then each of S first-dimension beam-forming weights among the N first-dimension beam-forming weights corresponds respectively to one of the S second-dimension downlink reference signal resources in the first correspondence relationship; or if N is less than S, then each first-dimension beam-forming weight corresponds to one of the S second-dimension downlink reference signal resources in the first correspondence relationship, and all the first-dimension beam-forming weights corresponding to the S second-dimension downlink reference signal resources in the first correspondence relationship belong to a second set; and the second set comprises at least S first-dimension beam-forming weights, there is a second correspondence relationship between the first-dimension beam-forming weights in the second set, and the first-dimension beam-forming weights in a first set, at least one of the first-dimension beam-forming weights in the first set corresponds to more than one of the first-dimension beam-forming weights in the second set, and the first set comprises all of the N first-dimension beam-forming weights, and is configured in the terminal as a codebook for measuring the first-dimension downlink reference signal.

13. A terminal, comprising at least one processor and a memory, wherein the memory is configured to store computer readable program codes, the at least one processor is configured to execute the computer readable program codes to:
  obtain one first-dimension downlink reference signal resource, S second-dimension downlink reference signal resources, and a first correspondence relationship, configured by a network device, wherein the first correspondence relationship comprises a correspondence relationship between the S second-dimension downlink reference signal resources and N first-dimension beam-forming weights, and both S and N are integers greater than 1;
  measure a first-dimension downlink reference signal according to the first-dimension downlink reference signal resource to obtain a first-dimension Pre-coding matrix Indicator (PMI), wherein the first-dimension PMI indicates one of the N first-dimension beam-forming weights;
  select a second-dimension downlink reference signal resource from the S second-dimension downlink reference signal resources for measuring a second-dimension downlink reference signal, according to the first-dimension PMI and the first correspondence relationship; and
  measure the second-dimension downlink reference signal, and feed back channel state information, according to the selected second-dimension downlink reference signal resource for measuring the second-dimension downlink reference signal, wherein the second-dimension downlink reference signal transmitted over the selected second-dimension downlink reference signal resource is transmitted after being beam-formed using a first-dimension beam-forming weight corresponding to the selected second-dimension downlink reference signal resource.

14. The terminal according to claim 13, wherein:
  if N is equal to S, then each first-dimension beam-forming weight corresponds to one of the S second-dimension downlink reference signal resources in the first correspondence relationship; or
  if N is greater than S, then in the first correspondence relationship, at least one of the S second-dimension downlink reference signal resources corresponds to a plurality of first-dimension beam-forming weights; and one of the plurality of first-dimension beam-forming weights is used for beam-forming on a downlink reference signal transmitted over the second-dimension downlink reference signal resource corresponding to the plurality of first-dimension beam-forming weights, the other first-dimension beam-forming weights of the plurality of first-dimension beam-forming weights are not be used for beam-forming on any downlink reference signal, and a correlation metric between the other first-dimension beam-forming weights, and the first-dimension beam-forming weight for beam-forming on the downlink reference signal transmitted over the second-dimension downlink reference signal resource corresponding to the plurality of first-dimension beam-forming weights is greater than a threshold;
  wherein the at least one processor is configured to execute the computer readable program codes to:
  refer to the first correspondence relationship using the first-dimension PMI, obtain a second-dimension downlink reference signal resource corresponding to the first-dimension PMI, and determine the obtained second-dimension downlink reference signal resource as the second-dimension downlink reference signal resource for measuring the second-dimension downlink reference signal.

15. The terminal according to claim 13, wherein if N is greater than S, then each of S first-dimension beam-forming weights among the N first-dimension beam-forming weights corresponds respectively to one of the S second-dimension downlink reference signal resources in the first correspondence relationship; and
  the at least one processor is configured to execute the computer readable program codes to:
  refer to the first correspondence relationship using the first-dimension PMI; and
  if a second-dimension downlink reference signal resource corresponding to the first-dimension PMI is found, determine the found second-dimension downlink reference signal resource as the second-dimension downlink reference signal resource for measuring the second-dimension downlink reference signal; or
  if no second-dimension downlink reference signal resource corresponding to the first-dimension PMI is found, select one of the S first-dimension beam-forming weights according to correlations between these S first-dimension beam-forming weights, and the first-dimension beam-forming weight indicated by the first-dimension PMI, refer to the first correspondence relationship for a second-dimension downlink reference signal resource corresponding to the selected first-dimension beam-forming weight, and determine a found second-dimension downlink reference signal resource as the second-dimension downlink reference signal resource for measuring the second-dimension downlink reference signal.

16. The terminal according to claim 13, wherein if N is less than S, then each first-dimension beam-forming weight corresponds to one of the S second-dimension downlink reference signal resources in the first correspondence relationship, and all the first-dimension beam-forming weights corresponding to the S second-dimension downlink reference signal resources in the first correspondence relationship belong to a second set, wherein the second set comprises at least S first-dimension beam-forming weights, there is a second correspondence relationship between the first-dimension beam-forming weights in the second set, and first-dimension beam-forming weights in a first set, at least one of the first-dimension beam-forming weights in the first set corresponds to more than one of the first-dimension beam-forming weights in the second set, and the first set comprises all of the N first-dimension beam-forming weights, and is configured in the terminal as a codebook for measuring the first-dimension downlink reference signal;
  the at least one processor is configured to execute the computer readable program codes to:
  obtain the second correspondence relationship configured by the network device; and refer to the second correspondence relationship using the first-dimension PMI, and obtain a first-dimension beam-forming weight in the second set corresponding to the first-dimension PMI, wherein the first-dimension PMI indicates a first-dimension beam-forming weight in the first set; and refer to the first correspondence relationship using the obtained first-dimension beam-forming weight in the second set, obtain a corresponding second-dimension downlink reference signal resource, and determine the obtained second-dimension downlink reference signal resource as the second-dimension downlink reference signal resource for measuring the second-dimension downlink reference signal.

17. A network device, comprising at least one processor and a memory, wherein the memory is configured to store computer readable program codes, the at least one processor is configured to execute the computer readable program codes to:

configure a terminal with one first-dimension downlink reference signal resource, S second-dimension downlink reference signal resources, and a first correspondence relationship comprising a correspondence relationship between the S second-dimension downlink reference signal resources and N first-dimension beam-forming weights, wherein both S and N are integers greater than 1;

transmit a first-dimension downlink reference signal according to the first-dimension downlink reference signal resource, and transmit second-dimension downlink reference signals according to the S second-dimension downlink reference signal resources, wherein a second-dimension downlink reference signal transmitted over each of the S second-dimension downlink reference signal resources is transmitted after being beam-formed using a first-dimension beam-forming weight corresponding to each of the S second-dimension downlink reference signal resources; and receive channel state information measured and fed back by the terminal using a second-dimension downlink reference signal among the second-dimension downlink reference signals, and obtain a channel state of the terminal from the channel state information, wherein the channel state information is obtained by the terminal by selecting a second-dimension downlink reference signal resource from the S second-dimension downlink reference signal resources for measuring the second-dimension downlink reference signal, according to a first-dimension Pre-coding matrix Indicator (PMI) obtained by measuring the first-dimension downlink reference signal, and the first correspondence relationship, and then measuring the second-dimension downlink reference signal according to the selected second-dimension downlink reference signal resource, and the first-dimension PMI indicates one of the N first-dimension beam-forming weights.

18. The network device according to claim 17, wherein the channel state information fed back by the terminal after measuring the second-dimension downlink reference signal comprises an index of the selected second-dimension downlink reference signal resource for measuring the second-dimension downlink reference signal, and a second-dimension PMI, a Rank Indicator (RI), and a Channel Quality Indicator (CQI) obtained by measuring the second-dimension downlink reference signal according to the selected second-dimension downlink reference signal resource for measuring the second-dimension downlink reference signal; and the at least one processor is configured to execute the computer readable program codes to:

determine a first-dimension beam-forming weight corresponding to the selected second-dimension downlink reference signal resource according to the index of the selected second-dimension downlink reference signal resource, and the first correspondence relationship; and combine a pre-coding matrix indicated by the second-dimension PMI with the determined first-dimension beam-forming weight into a pre-coding matrix of the terminal.

19. The network device according to claim 18, wherein the at least one processor is configured to execute the computer readable program codes to:

receive first-dimension PMIs fed back by terminals in a coverage area of the network device; and perform one or more of following first operation to third operation according to the first-dimension PMIs fed back by the terminals in the coverage area of the network device:

in a first operation, in an instance of N>S, selecting S first-dimension beam-forming weights from the N first-dimension beam-forming weights to perform beam-forming on downlink reference signals transmitted over the S second-dimension downlink reference signal resources;

in a second operation, in an instance of N>S, after selecting the S first-dimension beam-forming weights from the N first-dimension beam-forming weights to perform beam-forming on the downlink reference signals transmitted over the S second-dimension downlink reference signal resources, determining a distribution of the terminals according to the first-dimension PMIs fed back by the terminals in the coverage area of the network device, reselecting S first-dimension beam-forming weights from the N first-dimension beam-forming weights according to the distribution of the terminals to perform beam-forming on the downlink reference signals transmitted over the S second-dimension downlink reference signal resources, and notifying a correspondence relationship between the reselected S first-dimension beam-forming weights, and the S second-dimension downlink reference signal resources to the terminals;

in a third operation, determining a distribution of the terminals in the coverage area of the network device in a first dimension, and adjusting the first-dimension beam-forming weights according to the distribution of the terminals in the coverage area of the network device in the first dimension.

20. The network device according to claim 17, wherein:

if N is equal to S, then each first-dimension beam-forming weight corresponds to one of the S second-dimension downlink reference signal resources in the first correspondence relationship; or if N is greater than S, then in the first correspondence relationship, at least one of the S second-dimension downlink reference signal resources corresponds to a plurality of first-dimension beam-forming weights; and one of the plurality of first-dimension beam-forming weights is used for beam-forming on a downlink reference signal transmitted over the one of the S second-dimension downlink reference signal resources, the other first-dimension beam-forming weights of the plurality of first-dimension beam-forming weights are not be used for beam-forming on any downlink reference signal, and a correlation metric between the other first-dimension beam-forming weights, and the one of the plurality of first-dimension beam-forming weights for beam-forming on the downlink reference signal transmitted over the one of the S second-dimension downlink reference signal resources is greater than a threshold, or if N is greater than S, then each of S first-dimension beam-forming weights among the N first-dimension beam-forming weights corresponds respectively to one of the S second-dimension downlink reference signal resources in the first correspondence relationship; or if N is less than S, then each first-dimension beam-forming weight corresponds to one of the S second-dimension downlink reference signal resources in the first correspondence relationship, and all the first-dimension beam-forming weights corresponding to the S second-dimension downlink reference signal resources in the first correspondence relationship belong to a second set, wherein the second set comprises at least S first-dimension beam-forming weights, there is a second correspondence relationship between the first-dimension beam-forming weights in the second set, and first-dimension beam-forming weights in a first set, at least one of the first-dimension beam-forming weights in the first set corresponds to more than one of the first-dimension beam-forming weights in the second set, and the first set comprises all of the N first-dimension beam-forming weights, and is configured in the terminal as a codebook for measuring the first-dimension downlink reference signal.

* * * * *